US012793496B2

(12) United States Patent
Kaswan et al.

(10) Patent No.: US 12,793,496 B2
(45) Date of Patent: Nov. 10, 2026

(54) MONEY HANDLING SYSTEM AND MONEY HANDLING METHOD FOR GROUP-BASED MANAGEMENT OF MONEY REPLENISHMENT AND COLLECTION ACROSS A PLURALITY OF MONEY HANDLING APPARATUSES

(71) Applicant: GLORY LTD., Himeji (JP)

(72) Inventors: Madanmohan Kaswan, Himeji (JP); Yuki Hashitani, Himeji (JP); Yanan Zhao, Himeji (JP); David Sharpe, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 19/308,427

(22) Filed: Aug. 25, 2025

(65) Prior Publication Data

US 2025/0378727 A1 Dec. 11, 2025

Related U.S. Application Data

(63) Continuation of application No. PCT/JP2024/004748, filed on Feb. 13, 2024.

(30) Foreign Application Priority Data

Feb. 28, 2023 (JP) ................................ 2023-029320

(51) Int. Cl.
*G07D 11/245* (2019.01)
*G07D 11/34* (2019.01)

(52) U.S. Cl.
CPC ........... *G07D 11/245* (2019.01); *G07D 11/34* (2019.01)

(58) Field of Classification Search
CPC ...... G07D 11/245; G07D 11/24; G07D 11/34; G06Q 20/1085
USPC ........................................... 235/379; 705/43
See application file for complete search history.

(56) References Cited

FOREIGN PATENT DOCUMENTS

| | | | |
|---|---|---|---|
| JP | H10-021446 | A | 1/1998 |
| JP | 2018-026010 | A | 2/2018 |
| JP | 2020-017024 | A | 1/2020 |
| JP | 6945509 | B2 | 10/2021 |

OTHER PUBLICATIONS

International Search Report and Written Opinion mailed on Apr. 2, 2024, received for PCT Application PCT/JP2024/004748, filed on Feb. 13, 2024, 8 pages including English Translation.

*Primary Examiner* — Suezu Ellis
(74) *Attorney, Agent, or Firm* — XSENSUS LLP

(57) ABSTRACT

A money handling system includes: a plurality of money handling apparatuses configured to perform money handling; and a management apparatus communicably connected to the plurality of money handling apparatuses and configured to acquire, from each money handling apparatus, information on an inventory quantity for each kind of money in the apparatus. The plurality of money handling apparatuses are separated into a plurality of groups, and the management apparatus manages an inventory quantity for each kind of money by group, and requests replenishment or collection of money for each money handling apparatus, based on a threshold for each kind of money set for each group in addition to an inventory quantity for each kind of money in each money handling apparatus.

10 Claims, 12 Drawing Sheets

FIG.3A

TRANSACTION INFORMATION

| GROUP ID | STORE ID | APPARATUS ID | TRANSACTION CONTENT | |
|---|---|---|---|---|
| | | | TYPE | BREAKDOWN OF MONEY |
| G001 | S001 | M001 | DEPOSIT | $1···, $5··· |
| G001 | S002 | M011 | DISPENSE | $1···, $5··· |
| ⋮ | | | | |

FIG.3B

APPARATUS INVENTORY INFORMATION

| GROUP ID | STORE ID | APPARATUS ID | BANKNOTE | | COIN | |
|---|---|---|---|---|---|---|
| | | | DENOMINATION | QUANTITY | DENOMINATION | QUANTITY |
| G001 | S001 | M001 | $1 | 1··· | ¢1 | 1··· |
| | | | $5 | ··· | ¢5 | ··· |
| | | | ⋮ | | ⋮ | |
| | | M002 | ··· | | | |
| | | ⋮ | | | | |
| | S002 | ··· | | | | |
| | ⋮ | | | | | |
| G002 | ··· | | | | | |
| ⋮ | | | | | | |

FIG.3C

INVENTORY INFORMATION

| GROUP ID | BANKNOTE | | | | COIN | | | |
|---|---|---|---|---|---|---|---|---|
| | DENOMI-NATION | QUAN-TITY | THRESH-OLD | THRESHOLD: CHANGE CONDITION | DENOMI-NATION | QUAN-TITY | THRESH-OLD | THRESHOLD: CHANGE CONDITION |
| G001 | $1 | 1··· | ··· | ··· | ¢1 | 1··· | ··· | ··· |
| | $5 | ··· | | | ¢5 | ··· | | |
| | ⋮ | | | | ⋮ | | | |
| G002 | | | | | | | | |
| ⋮ | | | | | | | | |

FIG.8

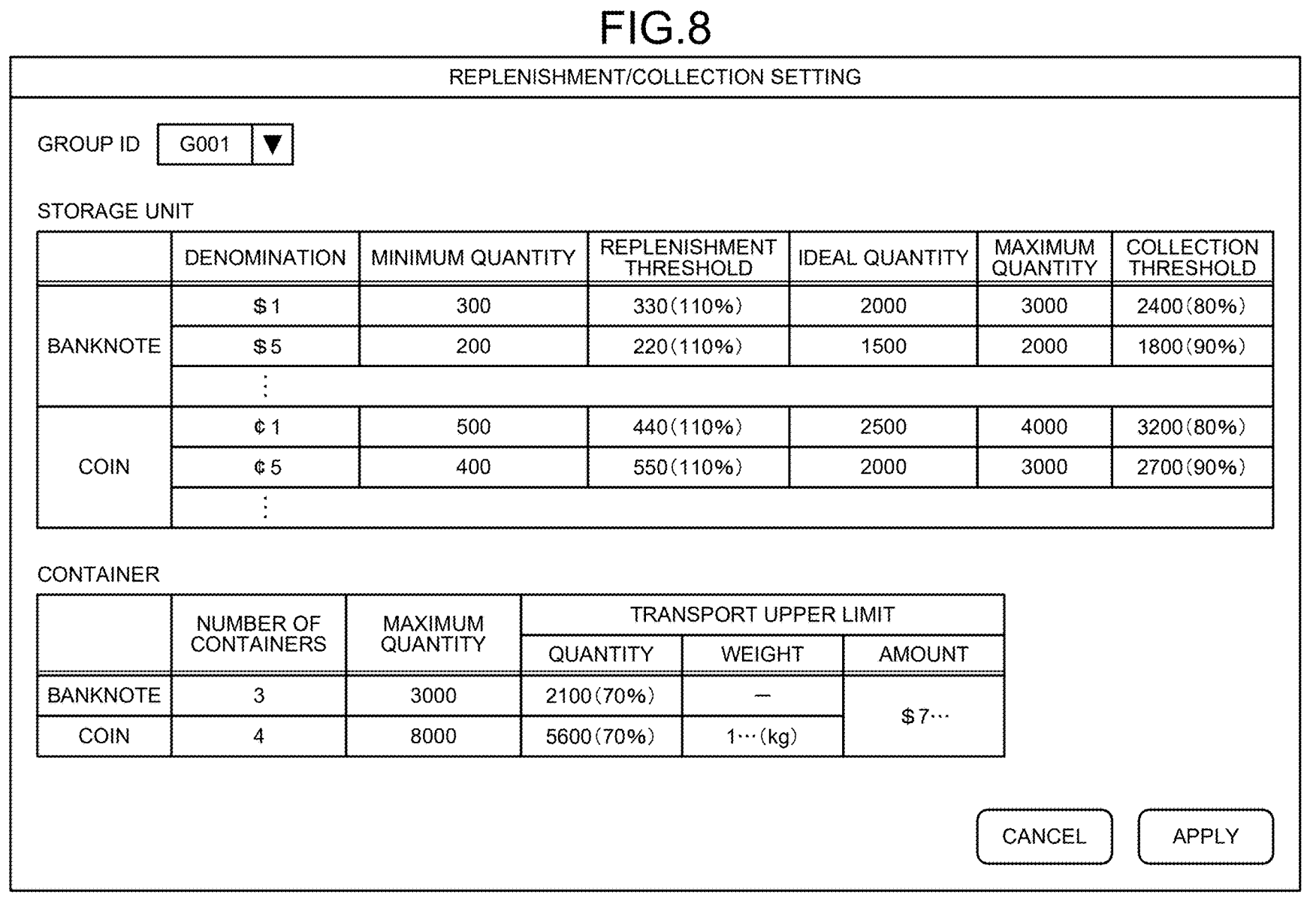

REPLENISHMENT/COLLECTION SETTING

GROUP ID G001 ▼

STORAGE UNIT

| | DENOMINATION | MINIMUM QUANTITY | REPLENISHMENT THRESHOLD | IDEAL QUANTITY | MAXIMUM QUANTITY | COLLECTION THRESHOLD |
|---|---|---|---|---|---|---|
| BANKNOTE | $1 | 300 | 330(110%) | 2000 | 3000 | 2400(80%) |
| | $5 | 200 | 220(110%) | 1500 | 2000 | 1800(90%) |
| | ⋮ | | | | | |
| COIN | ¢1 | 500 | 440(110%) | 2500 | 4000 | 3200(80%) |
| | ¢5 | 400 | 550(110%) | 2000 | 3000 | 2700(90%) |
| | ⋮ | | | | | |

CONTAINER

| | NUMBER OF CONTAINERS | MAXIMUM QUANTITY | TRANSPORT UPPER LIMIT | | |
|---|---|---|---|---|---|
| | | | QUANTITY | WEIGHT | AMOUNT |
| BANKNOTE | 3 | 3000 | 2100(70%) | — | $7··· |
| COIN | 4 | 8000 | 5600(70%) | 1···(kg) | |

CANCEL APPLY

MONEY HANDLING SYSTEM AND MONEY HANDLING METHOD FOR GROUP-BASED MANAGEMENT OF MONEY REPLENISHMENT AND COLLECTION ACROSS A PLURALITY OF MONEY HANDLING APPARATUSES

CROSS-REFERENCE RELATED TO APPLICATIONS

The present application is a bypass continuation of, and claims priority to, International application PCT/JP2024/004748, filed Feb. 13, 2024, the entire contents of which are incorporated herein by reference. PCT/JP2024/004748 claims priority to JP 2023-029320, filed Feb. 28, 2023, the entire contents of which are incorporated herein by reference.

TECHNICAL FIELD

The present disclosure relates to a money handling system and a money handling method for managing money in a plurality of money handling apparatuses.

BACKGROUND ART

Conventionally, money handling apparatuses have been used to deposit and dispense money in various places. For example, in a retail store, a money handling apparatus has been used to perform depositing of money paid by a customer who purchases an item and dispensing of change to be returned to the customer. The money handling apparatus cannot perform money handling while the apparatus is short of money or is full of money. In order to maintain an appropriate quantity of money in the money handling apparatus, replenishment work for supplying money that is short in the apparatus, and collection work for collecting surplus money in the apparatus are performed. For example, Japanese Patent No. 6945509 discloses technology for performing replenishment and collection of money for money handling apparatuses at each store, while visiting a plurality of stores. In this technology, a management apparatus manages the denominations and the quantity of money in the money handling apparatuses at each store. For example, when collection of money needs to be performed at a plurality of stores, the management apparatus automatically generates a management schedule including a route for visiting these stores, information on money to be collected at each store, and the like. A person, who performs money management work such as replenishment and collection of money to maintain an appropriate quantity of money in each apparatus, can easily proceed with the work while visiting the stores in sequence based on the management schedule generated by the management apparatus. Japanese Laid-Open Patent Publication No. H10-21446 and No. 2018-260103 also disclose technology for easily performing the money management work for money handling apparatuses at a plurality of stores.

SUMMARY

However, in the conventional art, it is determined whether replenishment or collection of money is necessary, based on money in each money handling apparatus, and thus money management work cannot be efficiently performed in some cases. For example, at a plurality of stores in the same region or one store where a plurality of money handling apparatuses are installed, money of a denomination that is short in one money handling apparatus may be stored in large quantities in another money handling apparatus. In this case, a person in charge of the money management work has delivered money of the denomination, which becomes short in one money handling apparatus, to the store and has replenished the apparatus with the delivered money. After the replenishment, money whose denomination is the same as that of the money for the replenishment may become surplus in another money handling apparatus and the person may have to collect the money from the other apparatus immediately after the replenishment work.

The present disclosure has been made in view of the problem, as well as other problems, of the conventional art, and the present disclosure addresses these issues, as discussed herein, with a money handling system and a money handling method by which money management work including replenishment and collection of money can be efficiently performed to manage money in a plurality of money handling apparatuses.

A money handling system according to one aspect of the present disclosure includes: a plurality of money handling apparatuses configured to perform money handling; and a management apparatus communicably connected to the plurality of money handling apparatuses and configured to acquire, from each money handling apparatus, information on an inventory quantity for each kind of money in the apparatus. The plurality of money handling apparatuses are separated into a plurality of groups. The management apparatus manages an inventory quantity for each kind of money by group, and requests replenishment or collection of money for each money handling apparatus, based on a threshold for each kind of money set for each group in addition to an inventory quantity for each kind of money in each money handling apparatus.

BRIEF DESCRIPTION OF THE DRAWINGS

FIGS. 3A, 3B, and 3C each show an example of information managed by the management apparatus.

FIG. 8 shows an example of a setting screen relating to replenishment/collection of money.

DESCRIPTION OF EMBODIMENT

Hereinafter, an embodiment of a money handling system and a money handling method according to the present disclosure will be described with reference to the accompanying drawings. In the money handling system, the kinds and the quantity for each kind of money in each of a plurality of money handling apparatuses are managed in order to prevent a case where money handling cannot be performed because money is short or an apparatus is full of money. In the money handling system, the plurality of money handling apparatuses are grouped based on attributes of the apparatuses, and not only the inventory quantity of money in each apparatus but also money shortages or surpluses in each group can be detected. The money shortages or surpluses may be detected in each money handling apparatus belonging to a group, based on current inventory information of the money handling apparatus and/or by predicting a change in an inventory quantity in the money handling apparatus. A replenishment threshold for determining whether replenishment is necessary due to a shortage of money, and a collection threshold for determining whether collection is necessary due to a surplus of money, can be set for each kind of money managed in the group. It can be set that the replenishment threshold and the collection threshold are adjusted based on the status of money handling in the group. In other words, the timing to perform replenishment of money can be adjusted by changing the replenishment threshold, and/or the timing to perform collection of money can be adjusted by changing the collection threshold. In addition, in the money handling system, the work sequence and/or the travel route for replenishment of money and/or collection of money to transport money between a plurality of money handling apparatuses can be adjusted. For example, after money is collected from a money handling apparatus, the collected money is used to replenish another money handling apparatus that is short of such money.

In the present embodiment, money includes at least one of a banknote and a coin. The kinds of money include currency and denominations, but in the following description, they are simply referred to as a denomination in some cases. The inventory quantity of money may be referred to as the quantity of money or a monetary amount, but in the following description, it is simply referred to as the quantity of money in some cases. A threshold for determining whether replenishment of money is necessary is referred to as a replenishment threshold, and a threshold for determining whether collection of money is necessary is referred to as a collection threshold, but when describing at least one of the replenishment threshold and the collection threshold, it is referred to as a threshold in some cases. Regarding replenishment of money and collection of money, when describing at least one of them, it is referred to as replenishment/collection of money in some cases.

[Outline of Money Handling System]

Figure 1:
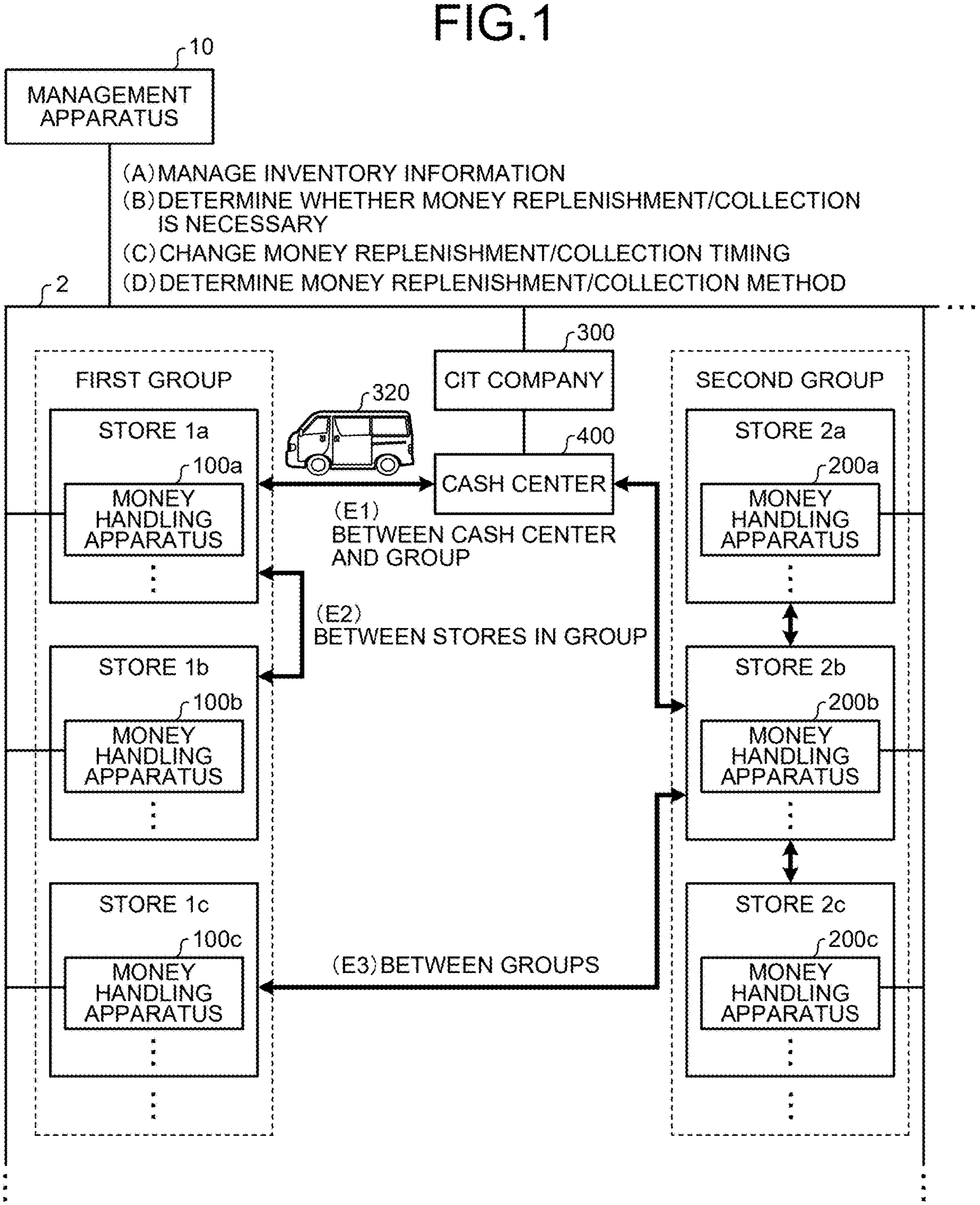
FIG. 1 schematically shows an outline of a money handling system according to the present embodiment.

FIG. 1 schematically shows an outline of a money handling system according to the present embodiment. The money handling system includes a management apparatus 10 and a plurality of money handling apparatuses 100 (100*a* to 100*c*) and 200 (200*a* to 200*c*). The management apparatus 10 and each of the money handling apparatuses 100, 200 are communicably connected via a network 2.

The management apparatus 10 can manage the money handling apparatuses 100, 200 in association with the attributes. Examples of information which can be used as the attributes include information on the installation place of each of the money handling apparatuses 100, 200. For example, in the management apparatus 10, the money handling apparatus 100*a* installed at a store 1*a* is managed in association with a store ID (identification information) indicating the store 1*a*. Instead of or in addition to the store ID, other information regarding the store such as information on a company operating the store and information for discriminating between a main store and a branch store of the company, may be used as the attributes. The attributes may include information on a region such as a municipality. The attributes may include floor information of the store such as a first floor or a second floor, and/or store sales section information such as a grocery section or a daily necessities section.

The management apparatus 10 can group the plurality of money handling apparatuses 100, 200 based on the attributes, and can manage money by group. For example, the plurality of money handling apparatuses 100, 200 are grouped by store. For example, the plurality of money handling apparatuses 100, 200 are grouped by region, such that apparatuses installed in a certain region are grouped into a first group and apparatuses installed in a region different from that of the first group are grouped into a second group. Grouping may be performed based on at least one of the information on company, the information on floor, and the information on sales section.

Hereinafter, as indicated by broken lines in FIG. 1, the description will be continued with an example in which the money handling apparatuses 100 installed at stores 1*a*, 1*b*, and 1*c* are classified into a first group, and the money handling apparatuses 200 installed at stores 2*a*, 2*b*, and 2*c* are classified into a second group. When description content for each group becomes the same, the content will be described using the first group as an example. One money handling apparatus is provided at each store in two groups in the example shown in FIG. 1; however, the number of groups in the money handling system, the number of stores in each group, and the number of money handling apparatuses installed at each store are not particularly limited.

The management apparatus 10 can manage inventory information of money by group (A). The inventory information for each group is managed by acquiring inventory information for each of the money handling apparatuses 100, 200. The management apparatus 10 aggregates, by group, the kinds and the quantity for each kind of money stored in each of the money handling apparatuses 100, 200, thereby managing the kinds and the quantity for each kind of money in each group. Hereinafter, inventory information for each of the money handling apparatuses 100, 200 is referred to as "apparatus inventory information", and is discriminated from "inventory information" for each group.

The management apparatus 10 can determine whether replenishment of money is necessary in each group and whether collection of money is necessary in each group (B). The determination as to whether replenishment of money is necessary and the determination as to whether collection of money is necessary are performed based on the replenishment threshold and the collection threshold set for each kind of money in each group.

The determination as to whether replenishment/collection is necessary is performed by group. When replenishment of money of a certain kind is required for the money handling apparatus 100*a* among the plurality of money handling apparatuses 100*a* to 100*c* belonging to the first group, a quantity obtained by summing up the quantities of the money of the same kind stored in all the money handling apparatus 100*a* to 100*c* belonging to the first group may be more than the replenishment threshold set for the first group. In this case, the management apparatus 10 determines that replenishment is not required for the first group. The management apparatus 10 may determine that replenishment from a cash center 400 is not required for this group. In other words, the management apparatus 10 may determine that replenishment of money is not required for a group, or may determine that money need not be transported to the group from the cash center 400 because the shortage of money can be addressed by transporting money between apparatuses in the same group. In the latter case, money may be transported to the money handling apparatus 100*a* requiring replenishment of money, from the other money handling apparatus(es) 100*b*, 100*c*, in the same group. In this case, the replenishment can be completed within the group and therefore, it is unnecessary to request a cash-in-transit (CIT) company 300 to transport money. The management apparatus 10 may notify a money handling apparatus that is a transport source of money and another money handling apparatus that is a transport destination of the money, of information on money to be transported for the replenishment. Alternatively, the notification destinations may be stores using these money handling apparatuses. Specifically, the management apparatus 10 may notify a store where the apparatus of the transport source is installed and another store where the apparatus of the transport destination is installed, of the information on the money transport.

Similarly, when collection of money of a certain kind is required for the money handling apparatus 100*a*, a quantity obtained by summing up the quantities of the money of the same kind stored in all the money handling apparatus 100*a* to 100*c* belonging to the same group may be less than the collection threshold set for the group. In this case, the management apparatus 10 determines that collection is not required for this group. The management apparatus 10 may determine that money need not be transported to the cash center 400 from this group. In other words, the management apparatus 10 may determine that money need not be collected for a group, or may determine that money need not be transported from the group to the cash center 400 because the surplus of money can be addressed by transports of money between apparatuses in the same group. In the latter case, money may be transported from the money handling apparatus 100*a* requiring collection of money, to other money handling apparatus(es) 100*b*, 100*c*, in the same group. In this case, the collection can be completed within the group and therefore, it is unnecessary to request the CIT company 300 to transport money. The management apparatus 10 may notify a money handling apparatus that is a transport source of money and another money handling apparatus that is a transport destination of the money, or stores where such money handling apparatuses are installed, as notification destinations, of information on money to be transported.

The management apparatus 10 can change the timing of replenishment of money and/or the timing of collection of money (C). Specifically, the management apparatus 10 can adjust the timing for requesting the CIT company 300 to perform the replenishment/collection of money. For example, the management apparatus 10 predicts the time until the quantity of money in each group reaches the replenishment threshold and the time until the quantity of money in each group reaches the collection threshold. The management apparatus 10 adjusts the timing of replenishment of money and/or the timing of collection of money, based on the prediction result. For example, the management apparatus 10 adjusts the timing of replenishment of money by changing the replenishment threshold in each group, and/or adjusts the timing of collection of money by changing the collection threshold in each group.

The management apparatus 10 can determine a money replenishment method and/or a money collection method (D). The money replenishment method and the money collection method determined by the management apparatus 10 are notified to the CIT company 300. The CIT company 300 performs replenishment and collection of money, based on the content of the notification received from the management apparatus 10.

The management apparatus 10 can determine one or more money handling apparatuses 100, 200 that are to discharge money to the outside of each apparatus during replenishment/collection, among the plurality of money handling apparatuses 100, 200 belonging to a group in which replenishment/collection of money is to be performed. The management apparatus 10 also determines the kinds and the quantity for each kind of money to be discharged from each of the money handling apparatuses 100, 200. Similarly, the management apparatus 10 can determine one or more money handling apparatuses 100, 200 that are to receive and store money in each apparatus during replenishment/collection, among the plurality of money handling apparatuses 100, 200 belonging to a group in which replenishment/collection of money is to be performed. The management apparatus 10 also determines the kinds and the quantity for each kind of money to be stored in each of the money handling apparatuses 100, 200. The management apparatus 10 can notify each of the determined money handling apparatuses 100, 200, of the determined kinds and the determined quantity for each kind of money to be discharged or stored. Upon being notified by the management apparatus 10, each of the money handling apparatuses 100, 200 can perform money handling for discharging therefrom and/or storing therein the notified quantities of the notified kinds of money.

The management apparatus 10 can identify stores where each of the money handling apparatuses 100, 200 to discharge or store money for the replenishment/collection is installed. The management apparatus 10 can determine the content and the sequence of work to be performed on each apparatus at each store by the CIT company 300. The management apparatus 10 can notify the CIT company 300 of a request for replenishment/collection work, based on the determined result. The notification includes information on the one or more money handling apparatuses 100, 200 that have been determined to discharge money therefrom or to store money therein, and information on the kinds and the quantity for each kind of money to be handled in each apparatus 100, 200. The notification may further include information on the store where each apparatus 100, 200 to perform the money handling is installed, information on the content and the sequence of work to be performed at each store, and information on the content and the sequence of work to be performed for each apparatus 100, 200 at each store.

Upon receiving the notification from the management apparatus 10, a person in charge of the CIT company 300 performs replenishment/collection work for each of the money handling apparatuses 100, 200 while visiting each store, based on the notification. For example, the person in charge causes a reading device of each of the money handling apparatuses 100, 200 that has been determined to discharge money, to read a card medium including predetermined authentication information prepared in advance for authenticating the CIT company 300. The money handling apparatus 100, 200 that has read the authentication information from the card medium and performed an authentication process, recognizes that money handling by the CIT company 300 is required. The money handling apparatus 100, 200 performs the money handling for discharging money, which has been notified by the management apparatus 10, to outside the apparatus. For example, the money handling apparatus 100, 200 discharges money to outside the apparatus through a dispensing unit. For another example, the money handling apparatus 100, 200 stores money in a container, and thus the money can be discharged to outside the apparatus by removing the container from the apparatus. Similarly, when the person in charge of the CIT company 300 causes the reading device of the money handling apparatus 100, 200 that has been determined to store money, to read the card medium. The money handling apparatus 100, 200 performs money handling for storing money, which has been notified by the management apparatus 10, in the apparatus. For example, the money handling apparatus 100, 200 stores, in the apparatus, money received through a depositing unit. For another example, a container, in which money is stored, is mounted to the money handling apparatus 100, 200, and the money handling apparatus 100, 200 feeds out the money from the container to store the money in the apparatus. A configuration example of the money handling apparatus 100, 200 will be described below.

The CIT company 300 performs the transport of money among a plurality of places and/or the transport of money among the plurality of money handling apparatuses 100, 200, based on the content and the sequence of replenishment/collection work determined by the management apparatus 10 (E1 to E3).

The management apparatus 10 may determine to transport money between the cash center 400 and a group, for replenishment/collection of money. The management apparatus 10 can determine a store for which the money is transported, among a plurality of stores belonging to each group, and notify the CIT company 300 of information on the determined store. The management apparatus 10 can determine a money handling apparatus for which the money is transported, among a plurality of money handling apparatuses belonging to each group, and notify the CIT company 300 of information on the determined money handling apparatus.

Upon receiving the notification, the CIT company 300 uses a cash-in-transit car 320 as shown in FIG. 1, and transports money between the cash center 400, and the store or the money handling apparatus determined by the management apparatus 10 (E1). The cash center 400 is a base to be used by the CIT company 300 for preparing money for replenishment and performing post-handling of the collected money.

For example, money for replenishment in the first group is transported from the cash center 400 to the store 1*a*. The money for replenishment may be transported from the cash center 400 to a plurality of stores in the same group. Regarding collection of money, money for collection in the first group is transported from the store 1*a* to the cash center 400, for example. The money may be collected from a plurality of stores in the same group, and transported to the cash center 400.

For example, money for replenishment in the second group is transported from the cash center 400 to the store 2*b* as a base of the second group. A part or all of the money transported to the store 2*b* may be delivered from the store 2*b* to the other stores 2*a*, 2*c* in the second group. The money for collection in the second group is transported from the store 2*b* used as the base of the second group to the cash center 400. The money from the other stores 2*a*, 2*c* may be collected and gathered in the store 2*b*, and then transported to the cash center 400.

The management apparatus 10 may determine to transport money between stores in the same group for replenishment/collection of money. The management apparatus 10 can determine between which stores the money is to be transported, among a plurality of the stores belonging to the same group, and notify the CIT company 300 of information on the determined stores. The management apparatus 10 can determine between which money handling apparatuses the money is to be transported, among a plurality of the money handling apparatuses belonging to the group, and notify the CIT company 300 of information on the determined money handling apparatuses.

Upon receiving the notification, the CIT company 300 transports money between the stores and/or the money handling apparatuses, which have been determined by the management apparatus 10, in the same group (E2). For example, in a case where the money handling apparatus 100*b* at the store 1*b* in the first group is to be replenished with money of a certain kind and a large quantity of money of the same kind is currently stored in the money handling apparatus 100*a* at the store 1*a* in the same group, the money collected from the money handling apparatus 100*a* at the store 1*a* is transported to the money handling apparatus 100*b* at the store 1*b* that is short of such money, and the money handling apparatus 100*b* is replenished with the transported money.

The management apparatus 10 may determine to transport money between different groups for replenishment/collection of money. The management apparatus 10 can determine a store for which the money is to be transported, among a plurality of the stores belonging to the groups, and notify the CIT company 300 of information on the determined store. The management apparatus 10 can determine a money handling apparatus for which the money is to be transported, among a plurality of the money handling apparatuses belonging to the groups, and notify the CIT company 300 of information on the determined money handling apparatus. The management apparatus 10 may notify the money handling apparatus determined as a transport source of money and the money handling apparatus determined as a transport destination of the money, or stores where such money handling apparatuses are installed, as notification destinations, instead of the CIT company 300.

Upon receiving the notification, the CIT company 300 transports money between the stores in the different groups, that is, the money handling apparatuses in the different groups, which have been determined by the management apparatus 10 (E3). For example, surplus money is collected from the store 1*c* in the first group, and transported to the store 2*b* in the second group. For example, money of the kind that is short in the first group is collected from the store 2*b* in the second group, and transported to the store 1*c* in the first group.

Regarding cash transport between the cash center 400 and a group (E1), cash transport within a group (E2), and cash transport between groups (E3), two of E1 to E3, or all of E1 to E3 may be performed at one replenishment/collection work. In one example, money may be transported within the same group, and then surplus money in this group may be transported to the cash center 400.

[Example of Configuration of Apparatus]

Figure 2:
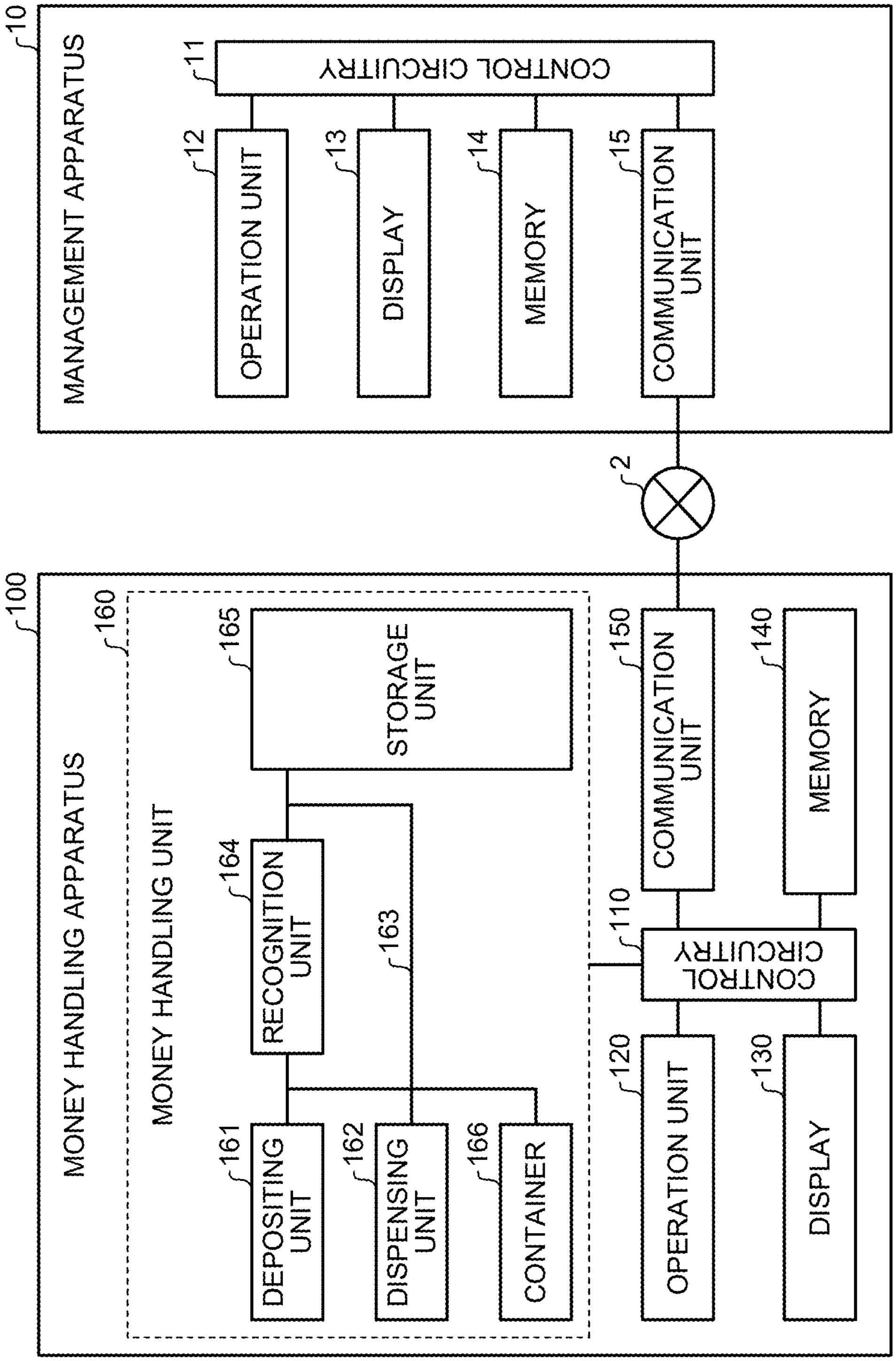
FIG. 2 shows examples of configurations of a management apparatus and a money handling apparatus.

FIG. 2 shows an example of configurations of the management apparatus 10 and the money handling apparatus 100, 200. The money handling system includes the management apparatus 10 and a plurality of the money handling apparatuses 100, 200. For example, a computer device including a control circuitry 11, an operation unit 12, a display 13, a memory 14, and a communication unit 15 is used as the management apparatus 10. Since such a computer device has been conventionally known, detailed description thereof is omitted. FIG. 2 shows an example, and does not limit the configuration of the management apparatus 10. The management apparatus 10 may not necessarily include the operation unit 12 and the display 13, and may be operated through an operation terminal including an operation unit and a display. The management apparatus 10 may be implemented on the cloud, or by using a plurality of computer devices.

The configuration of the money handling apparatus 100, 200 is not particularly limited, as long as the money handling apparatus 100, 200 can perform money handling including at least one of a depositing process of storing money received from outside an apparatus into the apparatus and a dispensing process of discharging money from inside an apparatus to outside. The money handling apparatus 100, 200 may be an apparatus such as an ATM or a teller machine that is used at a financial institution. The money handling apparatus 100, 200 may be an apparatus for checkout such as a change machine or a self-checkout machine that is used at a retail store. The money handling apparatus 100, 200 may be an apparatus such as a vending machine, a ticket vending machine, or a money changer. FIG. 2 shows a configuration example of the money handling apparatus 100, as an example of the money handling apparatuses 100, 200. The money handling apparatus 100 shown in FIG. 2 includes a control circuitry 110, an operation unit 120, a display 130, a memory 140, a communication unit 150, and a money handling unit 160.

The display 130 displays various kinds of information on money handling and various kinds of information on settings for the money handling. The operation unit 120 receives various operations relating to the money handling and various operations relating to the settings for the money handling. The communication unit 150 communicates with the management apparatus 10 via a network 2. The memory 140 stores therein data and programs required for operations of the money handling apparatus 100. The money handling unit 160 performs money handling in which actual money is handled. For example, a program corresponding to the control circuitry 110 is stored in advance in the memory 140 or a dedicated memory, and this program is executed by hardware such as a CPU, thereby realizing the function and operation of the control circuitry 110. The control circuitry 110 controls the respective components, thereby realizing the function and operation of the money handling apparatus 100. For example, apparatus inventory information for specifying the kinds and the quantity for each kind of money in the money handling unit 160 is transmitted to the management apparatus 10 via the network 2. For example, the money handling unit 160 performs money handling, based on the notification received from the management apparatus 10.

The money handling unit 160 can perform a plurality of kinds of money handling including a depositing process and a dispensing process. The money handling unit 160 includes a depositing unit 161, a dispensing unit 162, a transport unit 163, a recognition unit 164, one or more storage units 165, and one or more containers 166. The depositing unit 161 can receive money from outside the apparatus, and can feed the money into the apparatus. The transport unit 163 can transport money along a transport path connecting the depositing unit 161, the dispensing unit 162, the recognition unit 164, the storage unit 165, and the container 166. The recognition unit 164 can recognize the kind of money being transported by the transport unit 163. The kinds to be recognized include the denomination and authentication of money. The kinds to be recognized may include the fitness, i.e., the degree of damage based on specified standards, of money. In the money handling system, a process relating to replenishment/collection of money is performed based on the kinds recognized by the recognition unit 164. The storage unit 165 stores therein money transported by the transport unit 163. For example, money is stored in the storage units 165 by denomination. In addition, the storage unit 165 can feed out money to be discharged from the apparatus. The container 166 is fixed to the money handling unit 160 such that the container 166 can be mounted and dismounted. The container 166 may be a cassette-type storage unit that stores money therein and feeds out the stored money. The container 166 may be a bag-type storage unit that only stores money therein. The dispensing unit 162 can discharge, to outside the apparatus, money transported by the transport unit 163. The money fed out by the storage unit 165 is discharged through the dispensing unit 162. Money of the kind that cannot be stored in the storage unit 165, among the money received by the depositing unit 161 and fed into the apparatus, is discharged through the dispensing unit 162.

In the depositing process, the money received by the depositing unit 161 is transported by the transport unit 163. The money is recognized and counted by the recognition unit 164, and stored in the storage unit 165. In the dispensing process, the money in the storage unit 165 is fed out therefrom and transported by the transport unit 163. The money is recognized and counted by the recognition unit 164, and discharged through the dispensing unit 162 to outside the apparatus.

In a collection process using the container 166, the money to be collected from the storage unit 165 is transported by the transport unit 163. The money is recognized and counted by the recognition unit 164, and stored in the container 166. The container 166 is dismounted from the money handling apparatus 100 to collect money together with the container. In a collection process using the dispensing unit 162, the money to be collected from the storage unit 165 is transported by the transport unit 163, recognized and counted by the recognition unit 164. The money is discharged through the dispensing unit 162 to outside the apparatus and collected. The collection process may be performed without using the recognition unit 164 in a case where the kind of money fed out from the storage unit 165 can be specified.

In a replenishment process using the container 166, the container 166 storing the money for replenishment is mounted to the money handling apparatus 100. The money for replenishment is fed out from the container 166, and transported by the transport unit 163. The money is recognized and counted by the recognition unit 164, and stored in the storage unit 165. In the replenishment process using the depositing unit 161, the money is received via the depositing unit 161 and transported by the transport unit 163. The money is recognized and counted by the recognition unit 164, and stored in the storage unit 165.

FIG. 2 shows an example, and does not limit the configuration of the money handling apparatus 100, 200. The money handling apparatus 100, 200 may not necessarily include a part of the configuration shown in FIG. 2, or may include a configuration not shown in FIG. 2. The money handling apparatus 100, 200 may perform one or some of the depositing process, the dispensing process, the collection process, and the replenishment process described above. The money handling apparatus 100, 200 may be able to perform a process other than the above-described money handling.

[Management of Inventory Information]

The management apparatus 10 can manage inventory information in which the kinds and the quantity for each kind of money are managed by group. The management apparatus 10 can acquire apparatus inventory information from each of the money handling apparatuses 100, 200. The management apparatus 10 manages the kinds and the quantity for each kind of money in the first group, based on the apparatus inventory information of all the money handling apparatuses 100 belonging to the first group. Similarly, the management apparatus 10 manages the kinds and the quantity for each kind of money in the second group, based on the apparatus inventory information for all the money handling apparatuses 200 belonging to the second group.

For example, transaction information including the contents of money handling performed in the money handling apparatuses 100, 200 is transmitted to the management apparatus 10. The management apparatus 10 manages the transaction information received from each of the money handling apparatuses 100, 200, and updates inventory information for each group, based on the transaction information. The money handling apparatuses 100, 200 may perform money handling and update inventory information managed inside the apparatus. In this case, the inventory information may be transmitted from the money handling apparatuses 100, 200 to the management apparatus 10, whereby the inventory information for each group is managed in the management apparatus 10.

FIGS. 3A to 3B each shows an example of information managed by the management apparatus 10. FIG. 3A shows an example of transaction information managed by the management apparatus 10. The management apparatus 10 can recognize the attributes of each of the money handling apparatuses 100, 200 as transmission sources of transaction information. The attribute includes a group ID, a store ID, and an apparatus ID. The apparatus ID is identification information for each of the money handling apparatuses 100, 200. The store ID is identification information for a store where each of the money handling apparatuses 100, 200 is installed. The group ID is identification information for a group to which each of the money handling apparatuses 100, 200 belongs. For example, the management apparatus 10 may acquire information on the attributes when communicating with the money handling apparatus 100, 200. For example, the management apparatus 10 manages apparatus IDs in association with other attributes, and when communicating with the money handling apparatus 100, 200, the management apparatus 10 may acquire an apparatus ID and identify the other attributes based on the acquired apparatus ID.

As shown in FIG. 3A, the transaction information includes group ID, store ID, apparatus ID, and transaction content. The transaction content includes type and breakdown of money. The type is a type of money handling performed by the money handling apparatus 100, 200. The breakdown of money includes kinds and the quantity for each kind of money handled through money handling.

It is assumed that the apparatus ID of the money handling apparatus 100*a* is "M001", the store ID of the store 1*a* is "S001", and the group ID of the first group is "G001" in the example shown in FIG. 1. In a case where a depositing process is performed in the money handling apparatus 100*a*, transaction information on the depositing process is registered as shown in the first row in FIG. 3A. The transaction content includes the denominations, and the quantity or the amount of the money for each denomination of money deposited in the depositing process.

FIG. 3B shows an example of apparatus inventory information managed by the management apparatus 10. The management apparatus 10 manages the apparatus inventory information shown in FIG. 3B, based on the transaction information shown in FIG. 3A. The apparatus inventory information includes banknote information and coin information, in addition to group ID, store ID, and apparatus ID. The banknote information and the coin information include inventory information, that is, the kinds and the quantity for each kind of money. The management apparatus 10 can identify the kinds and the quantity for each kind of money stored in each of the money handling apparatuses 100, 200, based on the apparatus inventory information shown in FIG. 3B.

FIG. 3C shows an example of inventory information managed by the management apparatus 10. The management apparatus 10 manages the inventory information shown in FIG. 3C, based on at least one of the transaction information shown in FIG. 3A and the apparatus inventory information shown in FIG. 3B. The inventory information includes group ID, banknote information, and coin information. The banknote information and the coin information each includes denomination (kind), quantity (the amount of money), threshold, and threshold change condition. The threshold includes a replenishment threshold and a collection threshold. The replenishment threshold and the collection threshold can be set for each kind of money. For example, when the quantity of money of a denomination is decreased and reaches the replenishment threshold or less, the management apparatus 10 determines that the group is required to be replenished with money of this denomination. When the quantity of money of a denomination is increased and reaches the collection threshold or more, the management apparatus 10 determines that money of this denomination is required to be collected from the group.

The threshold change condition includes a determination condition for determining whether a threshold is to be changed, and information on a method for changing the threshold when the determination condition is satisfied. One or more determination conditions can be set for each kind of money. The method for changing the threshold can be set for each determination condition. The threshold change condition can be set for each kind of money. The threshold change condition may be set for the replenishment threshold and/or the collection threshold.

For example, if the transition of the quantity of money within a predetermined time period from the present to the past satisfies a predetermined condition, the threshold may be changed. For example, if the current date and time satisfies the predetermined condition, the threshold may be changed. As a method for changing the threshold, the threshold may be changed to a predetermined value, or the threshold may be increased or decreased by a predetermined rate.

FIGS. 3A to 3C show examples of information that can be managed by the management apparatus 10, and do not limit the kind of the information and/or a method for managing the information. The management apparatus 10 may manage a part of the information shown in FIGS. 3A to 3C. The management apparatus 10 may manage information not shown in FIG. 3. The management apparatus 10 may manage the information shown in FIGS. 3A to 3C by a different method.

[Determination on Necessity of Replenishment/Collection of Money]

Figure 4:
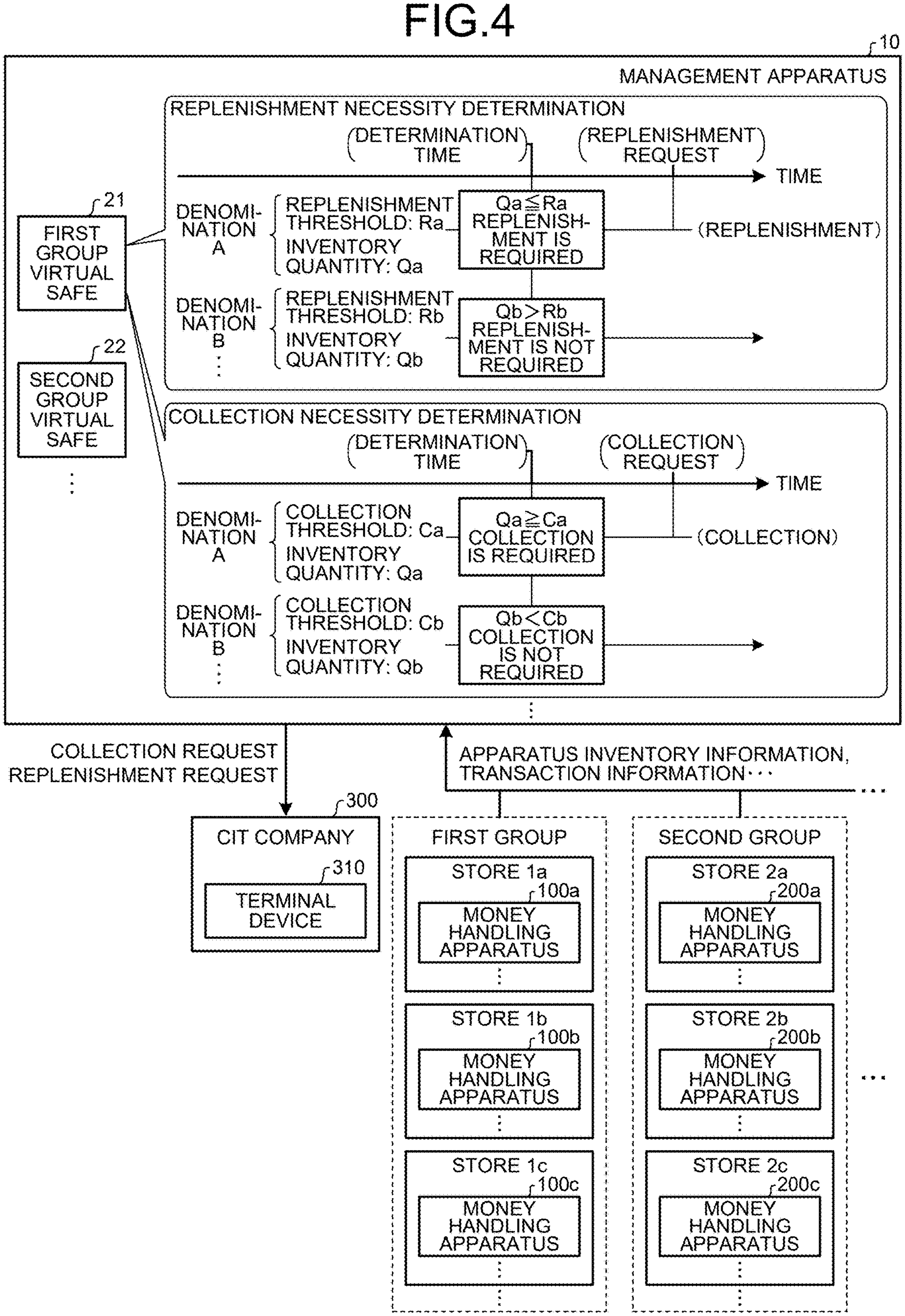
FIG. 4 illustrates handling performed in the money handling system.

The management apparatus 10 can manage money stored in the plurality of money handling apparatuses 100, 200, based on the information shown in FIGS. 3A and/or 3B. The management apparatus 10 can determine whether replenishment of money is necessary and whether collection of money is necessary, by group, based on the inventory information shown in FIG. 3C. FIG. 4 illustrates a determination method, which is performed by the management apparatus 10, for replenishment/collection of money.

The management apparatus 10 manages money stored in the plurality of money handling apparatuses 100, 200, by group. As shown in FIG. 4, this is a concept of managing the money in the money handling apparatuses 100, 200 as if the money in all the apparatuses 100 belonging to the first group is stored in a first group virtual safe 21, and money in all the money handling apparatuses 200 belonging to the second group is stored in a second group virtual safe 22.

For example, when the inventory quantity of money stored in the money handling apparatus 100 in the first group has changed, the management apparatus 10 handles it as if the inventory quantity of money in the first group virtual safe 21 has changed. The management apparatus 10 updates information for a group ID of "G001" in the inventory information shown in FIG. 3C. When the inventory quantity of money stored in the money handling apparatus 200 of the second group has changed, the management apparatus 10 handles it as if the inventory quantity of money in the second group virtual safe 22 has changed. The management apparatus 10 updates information for a group ID of "G002" in the inventory information.

The management apparatus 10 determines whether replenishment of money is necessary and whether collection of money is necessary by comparing an inventory quantity for each kind of money included in the inventory information and a threshold for each kind set in advance. That is, a determination as to whether replenishment/collection of money is necessary is performed, based on the quantity and the threshold in the inventory information shown in FIG. 3C.

For example, each time money handling is performed in the money handling apparatus 100, 200 and the quantity for each kind of money stored in the apparatus changes, the management apparatus 10 determines whether replenishment of money is necessary or whether collection of money is necessary. Regarding each denomination whose inventory quantity has been decreased, determination as to whether replenishment of money is necessary is performed by comparing the inventory quantity and the replenishment threshold. Regarding each denomination whose inventory quantity has been increased, determination as to whether collection of money is necessary is performed by comparing the inventory quantity and the collection threshold.

When determining the necessity of replenishment, if an inventory quantity Qa of a denomination A in the first group is equal to or less than a replenishment threshold Ra of the denomination A set for the first group as shown in FIG. 4, the management apparatus 10 determines that the first group needs replenishment of money of the denomination A. Since an inventory quantity Qb of a denomination B in the first group is more than a replenishment threshold Rb of the denomination B, the management apparatus 10 determines that the first group does not need replenishment of money of the denomination B. When determining the necessity of collection, if the inventory quantity Qa of the denomination A in the first group is equal to or more than a collection threshold Ca of the denomination A set for the first group, the management apparatus 10 determines that money of the denomination A needs to be collected from the first group. Since the inventory quantity Qb of the denomination B in the first group is less than a collection threshold Cb of the denomination B, the management apparatus 10 determines that money of the denomination B need not be collected from the first group. The determination as to whether replenishment of money is necessary and the determination as to whether collection of money is necessary are performed for each group.

If there is a group determined to need replenishment of money, the management apparatus 10 can determine a money replenishment method, and request the CIT company 300 to perform money replenishment work. Similarly, if there is a group determined to need collection of money, the management apparatus 10 can determine a money collection method, and request the CIT company 300 to perform money collection work.

For example, a request notification for replenishment/collection of money is transmitted from the management apparatus 10 to a specified terminal device 310 in the CIT company 300 as shown in FIG. 4. The notification includes the replenishment method and/or the collection method determined by the management apparatus 10. For example, the content of the notification is displayed on a display of the terminal device 310. Upon receiving the notification, the CIT company 300 performs replenishment/collection of money, based on the replenishment method and/or the collection method determined by the management apparatus 10, as described with reference to FIG. 1.

If it has been determined that replenishment/collection of money is required, the management apparatus 10 can also transmit a notification to a specified notification destination other than the CIT company 300. For example, the management apparatus 10 displays the notification on a screen of a display provided for the money handling apparatus 100, 200. For example, the management apparatus 10 displays the notification on a communication terminal used by a manager who manages the money handling apparatus 100, 200. The content of the notification includes the replenishment method and the collection method determined by the management apparatus 10. A store having the money handling apparatus 100, 200 for which replenishment or collection of money is to be performed can prepare for arrival of the CIT company 300, based on the notification from the management apparatus 10.

For example, each of the money handling apparatuses 100, 200 determines whether replenishment/collection of money is necessary, based on apparatus inventory information managed in the apparatus and a threshold set in advance in the apparatus. When the money handling apparatus 100, 200 determines that replenishment/collection of money is required, the apparatus notifies the determination result. The management apparatus 10 determines whether replenishment/collection is necessary for each kind of money. The determination is performed for all the money handling apparatuses 100, 200 belonging to the same group, and when determining that replenishment/collection is required for the group, the management apparatus 10 notifies the determination result. Thus, there is a case where the money handling apparatus 100, 200 determines that replenishment of money is required but the management apparatus 10 does not determine that the group to which the money handling apparatus 100, 200 belongs requires replenishment of money. Similarly, there is a case where the money handling apparatuses 100, 200 determines that collection is required but the management apparatus 10 does not determine that the group to which the money handling apparatus 100, 200 belongs requires collection of money.

In a case where a notification for replenishment/collection of money is not received from the management apparatus 10 while one or more money handling apparatuses 100, 200 notify that replenishment/collection of money is required, a clerk and a manager of a store can recognize that the replenishment/collection of money notified by the money handling apparatus 100, 200 can be performed between the money handling apparatuses 100, 200 in the same group. Even if the money handling apparatus 100, 200 has determined that replenishment/collection of money is required, the notification to the CIT company 300 is not performed unless the management apparatus 10 determines that replenishment/collection of money is required for the group. Thus, the number of requests to the CIT company 300 for cash transport is minimized, and money can be efficiently utilized between the plurality of money handling apparatuses 100, 200 in the same group. If the management apparatus 10 has determined that it is not necessary to request replenishment/collection of money from/to the cash center 400, and that money only needs to be transported within the same group, the management apparatus 10 may send a request notification to request the CIT company to perform money transport from the money handling apparatus 100*a* to the money handling apparatus 100*b*, for example. Alternatively, the management apparatus 10 may transmit an instruction notification for transporting money from the money handling apparatus 100*a* to the money handling apparatus 100*b*, to the money handling apparatus 100*a* or the store 1*a* that is a money transport source and the money handling apparatus 100*b* or the store 1*b* that is a money transport destination, which are set as notification destinations for the money transport.

[Adjustment of Timing of Replenishment/Collection of Money]

In an example shown in FIG. 4, upon determining that replenishment/collection of money is required, the management apparatus 10 transmits a notification for requesting replenishment/collection of money, to the CIT company 300 immediately after the determination, for example. Alternatively, the management apparatus 10 can adjust the timing to transmit a request notification to the CIT company 300, i.e., the timing to perform replenishment/collection of money, based on the prediction inventory quantity of money. For ease of description, although the description will be continued with two denominations: a denomination A and a denomination B in the first group, as an example, the contents described below are performed for each denomination in each group as necessary.

(Prediction of Inventory Quantity)

The management apparatus 10 can determine whether replenishment/collection is necessary, based on the current inventory quantity of money. Additionally, it can be set that the management apparatus 10 predicts inventory quantity of money in the future and determines whether replenishment/collection is necessary based on the predicted inventory amount in the future. FIG. 5 illustrates a method for predicting the inventory quantity of money and determining whether replenishment/collection of money is to be performed. Rectangles shown in FIG. 5 each indicate a determination process by the management apparatus 10.

Figure 5A:
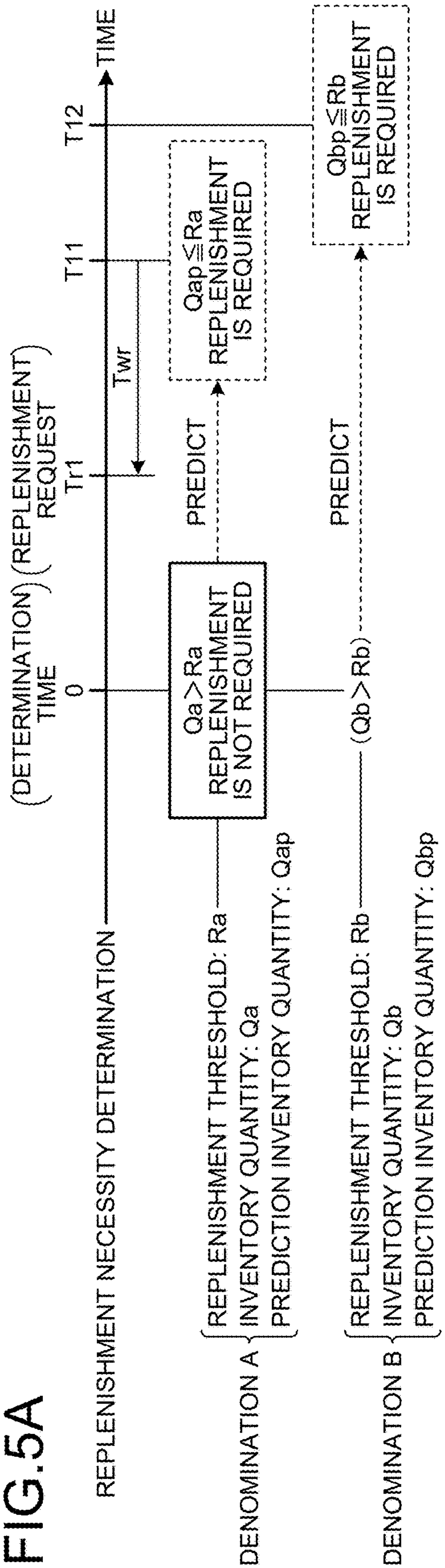
FIG. 5A illustrates a method for predicting an inventory quantity of money and determining whether to perform replenishment of money.

FIG. 5A shows an example of determination as to whether replenishment of money is necessary. When money handling is performed in the money handling apparatus 100 and the quantity of money is decreased in the inventory information for the first group to which the money handling apparatus 100 belongs, the management apparatus 10 determines whether replenishment is necessary by comparing the replenishment threshold with the decreased quantity of each kind of money. In a case where money of the denomination A has been decreased, if the current inventory quantity Qa of denomination A, whose inventory quantity has been decreased, is more than the replenishment threshold Ra set for the denomination A as shown in FIG. 5A, the management apparatus 10 determines that replenishment of money of the denomination A is not required. Although determination as to a denomination B is not performed since money of the denomination B is not decreased in the money handling in which the money of the denomination A has been decreased, the current inventory quantity Qb of the denomination B is more than the replenishment threshold Rb set for the denomination B, at the determination date and time ("determination time" in FIG. 5A) when the determination is performed for the denomination A.

Upon determining that replenishment of money is not required due to the money handling in which money of the denomination A has been decreased, the management apparatus 10 then predicts the time period until replenishment of money is required for all the denominations registered in the inventory information for the first group. As shown in FIG. 5A, the management apparatus 10 specifies a time period T11 until a prediction inventory quantity Qap of money of the denomination A reaches the replenishment threshold Ra or less, and a time period T12 until a prediction inventory quantity Qbp of money of the denomination B reaches a replenishment threshold Rb or less.

The management apparatus 10 compares the time periods T11, T12 obtained by predicting the time at which replenishment of money is required for each denomination, in order to determine the shortest time period. The management apparatus 10 determines a timing to transmit a request notification for the replenishment of money to the CIT company 300, i.e., the transmission date and time of the request notification, based on the time period T11 that is the shortest time elapsed from the determination time.

A predetermined replenishment work time period Twr can be set in the management apparatus 10. The replenishment work time period may be set based on the time elapsed from transmission of the request notification to the CIT company 300 until the CIT company 300 completes the requested replenishment of money. The management apparatus 10 can determine the timing for transmitting the request notification for replenishment of money to the CIT company 300, based on a time period Tr1 calculated by subtracting the replenishment work time period Twr from the time period T11. For example, the management apparatus 10 determines to transmit the request notification for replenishment of money to the CIT company 300 at the time and date after the time period Tr1 has elapsed from the determination date and time.

For example, in a case where the prediction time period T11 until replenishment of money of the denomination A is required from the determination date and time is 3 hours, the prediction time period T12 until replenishment of money of the denomination B is required from the determination date and time is 4 hours, and the replenishment work time period Twr is set to 1 hour, it is determined to request the CIT company 300 to perform replenishment of money after 2 hours, which is calculated by subtracting the replenishment work time period Twr from the shortest prediction time period T11.

Figure 5B:
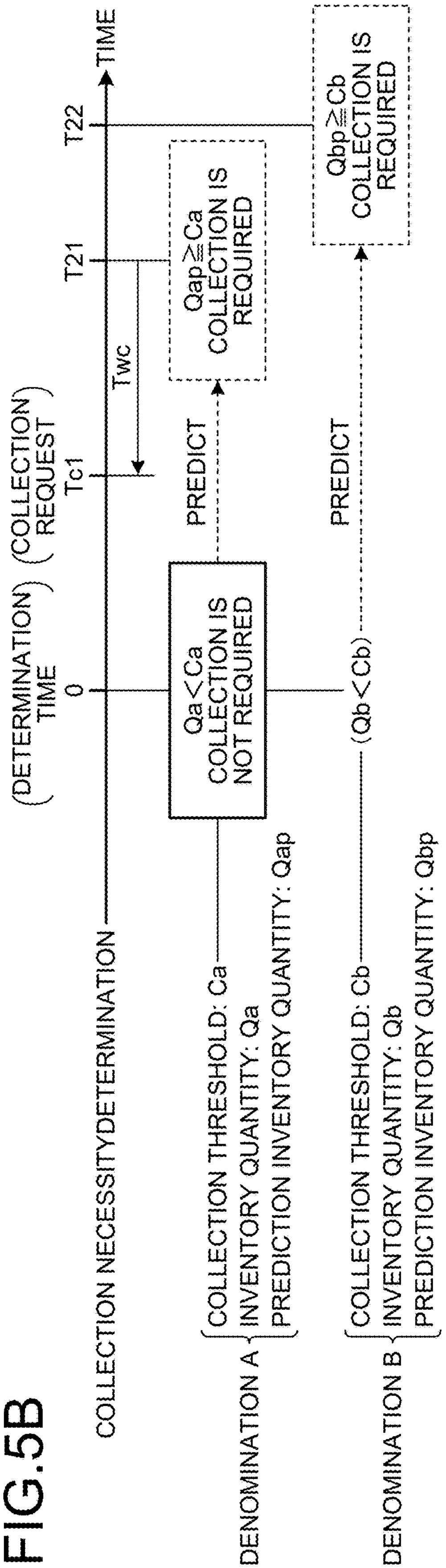
FIG. 5B illustrates a method for predicting an inventory quantity of money and determining whether to perform collection of money.

FIG. 5B shows an example of determination as to whether collection of money is necessary. When money handling is performed in the money handling apparatus 100 and the quantity of money is increased in the inventory information for the first group, the management apparatus 10 determines whether collection is necessary by comparing the collection threshold with the increased quantity for each kind of money. In a case where money of the denomination A has been increased, if the inventory quantity Qa of the denomination A, whose inventory quantity has been increased, is less than the collection threshold Ca set for the denomination A as shown in FIG. 5B, the management apparatus 10 determines that collection of money of the denomination A is not required. Although determination as to the denomination B is not performed since money of the denomination B is not increased, the current inventory quantity Qb of the denomination B is less than the collection threshold Cb set for the denomination B at the determination date and time ("determination time" in FIG. 5B) for the denomination A.

Upon determining that collection of money is not required, the management apparatus 10 then predicts the time period until collection of money is required for all the denominations registered in the inventory information for the first group. As shown in FIG. 5B, the management apparatus 10 specifies a time period T21 until the prediction inventory quantity Qap of money of the denomination A reaches the collection threshold Ca or more, and a time period T12 until the prediction inventory quantity Obp of money of the denomination B reaches the collection threshold Cb or more.

The management apparatus 10 compares the time periods T21, T22 obtained by predicting the time at which collection of money is required for each denomination. The management apparatus 10 can determine a timing to transmit a request notification for the collection of money to the CIT company 30, i.e., the transmission date and time of the request notification, based on the time period T21 that is the shortest time elapsed from the determination time.

A predetermined collection work time period Twc can be set in the management apparatus 10. The collection work time period may be set based on the time elapsed from transmission of the request notification to the CIT company 300 until the CIT company 300 completes the requested collection of money. The management apparatus 10 can determine the timing for transmitting the request notification for collection of money to the CIT company 300, based on a time period Tc1 calculated by subtracting the collection work time period Twc from the time period T21. For example, the management apparatus 10 determines that the request notification for collection of money is transmitted to the CIT company 300 at the time and date after the time period Tc1 has elapsed from the determination date and time.

For example, in a case where the prediction time period T21 until collection of money of the denomination A is required is 3 hours and 30 minutes, the prediction time period T22 until collection of money of the denomination B is required is 4 hours, and the collection work time period Twc is set to 30 minutes, it is determined to request the CIT company 300 to perform collection of money after 3 hours from the determination time, which is calculated by subtracting the collection work time period Twc from the prediction time period T21.

The inventory quantity of money, for each denomination, may be predicted based on the past transition of the inventory quantity in the first group, for example. Transition information on the inventory quantity to be used for prediction may be information on the transition of the inventory quantity within a predetermined time period from the determination date and time to the past. Transition information on the inventory quantity to be used for prediction may be information on the transition of the inventory quantity in the same date, the same day of the week, the same time slot, or the like in the past as that of the determination date and time. The inventory quantity of money may be predicted by utilizing various conventional prediction techniques such as AI (artificial intelligence) and statistical techniques, based on the past transition information on the inventory quantity.

The management apparatus 10 may revise the prediction result of the inventory quantity, based on events that influence changes in the inventory quantity of money. For example, the management apparatus 10 may revise the prediction result of the inventory quantity, based on information on a salary payment date of a company near a store in the first group, information on dates of ceremonial events such as a festival in the vicinity, or information on dates of special events such as a sale day of a store. The management apparatus 10 may revise the prediction result of the inventory quantity, based on information on time slots such as lunch break of a company near a store in the first group and a limited-time sale of a store. The management apparatus 10 may revise the prediction result of the inventory quantity, based on information on the weather near a store in the first group. Information used for revising the prediction result may be used by the management apparatus 10 to change a cash transportation route. For example, by preparing a setting in which the cash transportation route is changed on the occurrence date of a predetermined event such as a special event or another occasion, the management apparatus 10 determines the route for money, based on the setting.

For example, after the time until replenishment of money of a certain denomination is required has been predicted, if it is the occurrence date or the occurrence time slot of an event during which the inventory quantity of money of this denomination is likely to be decreased, the management apparatus 10 makes a revision to shorten the prediction time. Meanwhile, if it is the occurrence date or the occurrence time slot of an event during which the inventory quantity of money is unlikely to be decreased, the management apparatus 10 makes a revision to lengthen the prediction time. Similarly, after the time until collection of money is required has been predicted, if it is the occurrence date or the occurrence time slot of an event during which the inventory quantity of money of this denomination is likely to be increased, the management apparatus 10 makes a revision to shorten the prediction time. If it is the occurrence date or the occurrence time slot of an event during which the inventory quantity of money is unlikely to be increased, the management apparatus 10 makes a revision to lengthen the prediction time.

Regarding revision of the prediction time, the occurrence date or the occurrence time slot of an event and a revision method therefor are registered in advance in the management apparatus 10. In a prediction process, the management apparatus 10 may determine whether it is the registered occurrence date or the registered occurrence time slot of the event, and then may determine whether the prediction time is to be revised by the registered revision method. Information used for revising the prediction time may be used by the management apparatus 10 to change the cash transportation route. For example, if it is set such that the cash transportation route is changed according to the date or the time slot, the management apparatus 10 determines the cash transportation route, based on this setting.

The management apparatus 10 may revise the replenishment work time period Twr by the CIT company 300 or may revise the collection work time period Twc by the CIT company 300, based on a certain event. Also, in this case, the occurrence date or the occurrence time slot of the event and a revision method thereof are registered in advance in the management apparatus 10. In the prediction process, if it is the registered occurrence date or the registered occurrence time slot of the event, the management apparatus 10 may perform revision by the registered revision method. For example, in a case where the traffic situation changes due to a ceremonial event, a special event, the weather, or the like and thus it takes time for the CIT company 300 to transport cash, settings to lengthen a work time may be prepared according to a date and time, a day of the week, a time slot, or the like. For example, in a case where road works are being conducted on the cash transportation route when the CIT company 300 performs replenishment/collection and it has been known that a time for transporting cash is lengthened, or a case where it has been known that a work time is lengthened due to CIT company 300-related reasons such as a decrease in personnel in charge, it is sufficient to prepare the settings to lengthen the work time by specifying such duration.

After the management apparatus 10 has performed the prediction process to determine the transmission date and time of a request for replenishment/collection, determination as to whether replenishment or collection is necessary may be performed before reaching the determined date and time. In this case, the management apparatus 10 may perform the prediction process again, and may update the determined date and time. For example, in a case where, after the prediction process has been performed and the transmission date and time of a request notification to the CIT company 300 has been determined as 15:00 on the day, the prediction process is performed again and a result indicating that the request notification is transmitted at 15:10 on the day is obtained, the management apparatus 10 may update the transmission date and time of the request notification from 15:00 to 15:10.

In the examples in FIGS. 5A and 5B, when the inventory quantity in the inventory information for the group has changed and determination as to whether replenishment/collection is necessary is performed, the management apparatus 10 performs the prediction process. However, the prediction process may be performed at the other timings. For example, the management apparatus 10 may perform the prediction process at predetermined intervals, and may update the transmission date and time of the request notification for replenishment and collection.

(Change of Threshold Value)

Figure 6A:
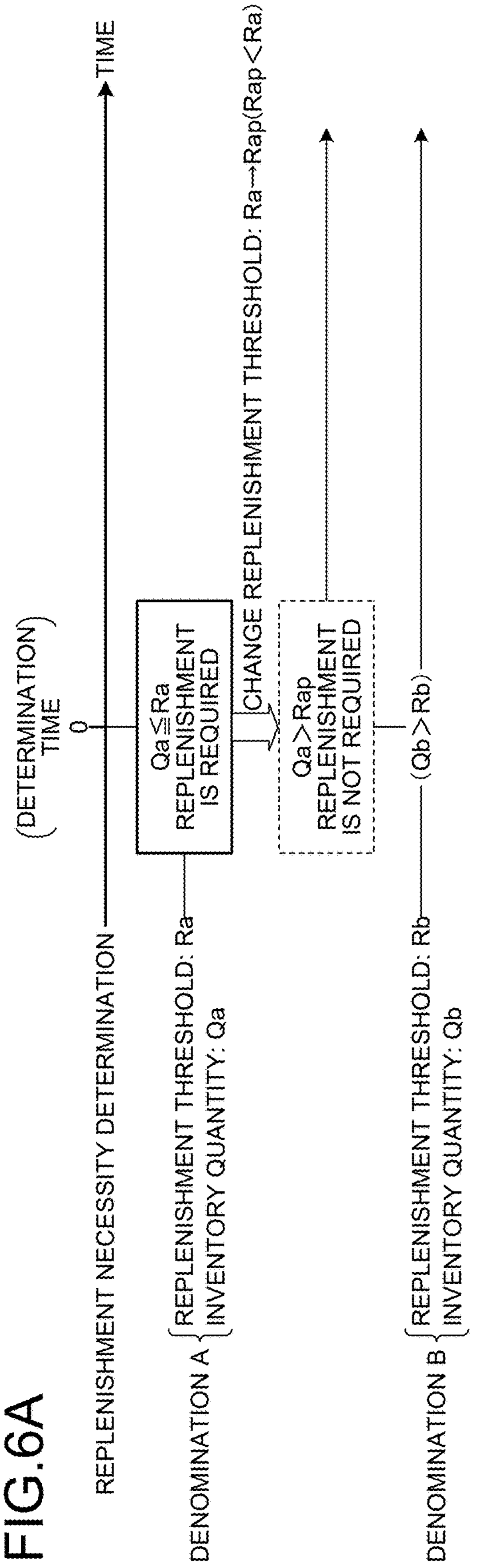
FIG. 6A illustrates an example in which a replenishment threshold is changed.
Figure 6B:
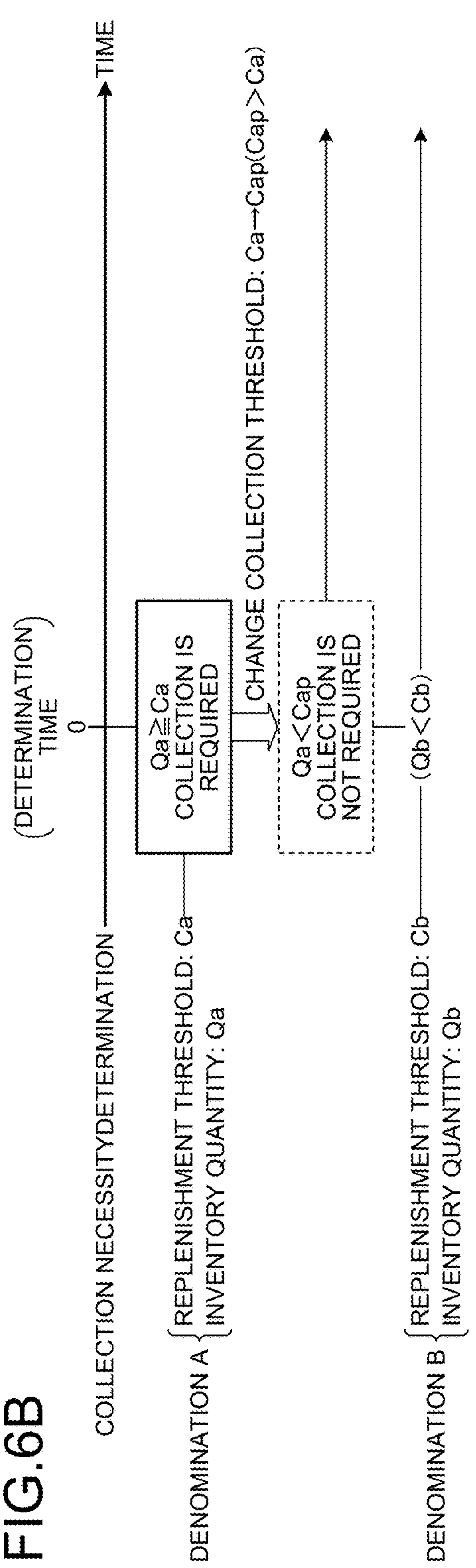
FIG. 6B illustrates an example in which a collection threshold is changed.

The management apparatus 10 can determine whether replenishment is necessary and whether collection is necessary, based on the current inventory quantity of money, the replenishment threshold, and the collection threshold. Additionally, the management apparatus 10 can change the timing of replenishment of money and the timing of collection of money by changing the replenishment threshold and the collection threshold. FIG. 6A illustrates an example in which the replenishment threshold is changed. FIG. 6B illustrates an example in which the collection threshold is changed. Rectangles shown in FIGS. 6A and 6B each indicate a determination process by the management apparatus 10.

FIG. 6A shows an example of determination as to whether replenishment of money is necessary. When the inventory quantity in the first group is decreased in the inventory information shown in FIG. 3C, the management apparatus 10 determines whether replenishment, for each kind of money whose inventory quantity has been decreased, is necessary. In a case where money of the denomination A has been decreased, if the current inventory quantity Qa of the denomination A is equal to or less than the replenishment threshold Ra as shown in FIG. 6A, the management apparatus 10 determines that replenishment of money of the denomination A is required. In the example shown in FIG. 6A, since the inventory quantity of money of the denomination B does not change, determination as to whether replenishment of money of the denomination B is necessary is not performed.

Upon determining that replenishment of money of the denomination A is required, the management apparatus 10 then determines whether the replenishment threshold for denomination A is to be changed with reference to the threshold change condition in the inventory information shown in FIG. 3C. If the replenishment threshold change condition for denomination A is satisfied and the replenishment threshold Ra for the denomination A has been changed to a replenishment threshold Rap, the management apparatus 10 again determines whether replenishment is necessary by comparing the current inventory quantity Qa with the changed replenishment threshold Rap. For example, if the replenishment threshold Ra has been changed to a smaller value Rap (Rap<Ra), and the inventory quantity Qa is more than the changed replenishment threshold Rap as shown in FIG. 6A, the management apparatus 10 acquires a final determination result indicating that replenishment is not required.

FIG. 6A shows an example. In a case where the threshold change condition is not satisfied, a request notification for replenishment of money is transmitted to the CIT company 300, based on the determination result using the replenishment threshold Ra. In a case where the replenishment threshold has been changed, but the current inventory quantity Qa is equal to or less than the changed replenishment threshold Rap, it is determined that the replenishment is required and the request notification for replenishment of money is transmitted to the CIT company 300. The method for changing the threshold may be set that the replenishment threshold Ra is changed to a larger value Rap (Rap>Ra) when the threshold change condition is satisfied.

The management apparatus 10 may not necessarily be configured to determine whether replenishment is necessary using the replenishment threshold Ra registered in the inventory information, then change the replenishment threshold based on the threshold change condition, and again perform determination. The management apparatus 10 may first determine whether the threshold change condition is satisfied, change the replenishment threshold Ra to Rap according to need, and then determine whether replenishment is necessary based on the threshold Ra or the changed threshold Rap.

FIG. 6B shows an example of determination as to whether collection of money is necessary. When the inventory quantity in the first group is increased in the inventory information shown in FIG. 3C, the management apparatus 10 determines whether collection, for each kind of money whose inventory quantity has been increased, is necessary. In a case where money of the denomination A has been increased, if the current inventory quantity Qa of the denomination A is equal to or more than the collection threshold as shown in FIG. 6B, the management apparatus 10 determines that the collection of money of the denomination A is required. In the example shown in FIG. 6B, since the inventory quantity of money of the denomination B does not change, determination as to whether collection of money of the denomination B is necessary is not performed.

Upon determining that collection of money of the denomination A is required, the management apparatus 10 then determines whether the collection threshold for denomination A is to be changed with reference to the threshold change condition in the inventory information. If the collection threshold change condition for denomination A is satisfied and the collection threshold Ca for the denomination A has been changed to a collection threshold Cap, the management apparatus 10 again determines whether collection is necessary by comparing the current inventory quantity Qa with the changed collection threshold Cap. For example, if the collection threshold Ca has been changed to a larger value Cap (Cap>Ca), and the inventory quantity Qa is less than the changed collection threshold Cap as shown in FIG. 6B, the management apparatus 10 acquires a final determination result indicating that collection is not required.

FIG. 6B shows an example. In a case where the threshold change condition is not satisfied, a request notification for replenishment of money is transmitted to the CIT company 300, based on the determination result using the collection threshold Ca. In a case where the collection threshold has been changed, but the current inventory quantity Qa is equal to or more than the changed collection threshold Cap, it is determined that the collection is required and the request notification for collection of money is transmitted to the CIT company 300. The method for changing the threshold may be set that the collection threshold is changed to a smaller value (Cap<Ca) when the threshold change condition is satisfied.

The management apparatus 10 may not necessarily be configured to determine whether collection is necessary using the collection threshold Ca registered in the inventory information, then change the collection threshold based on the threshold change condition, and again perform determination. The management apparatus 10 may first determine whether the threshold change condition is satisfied, change the collection threshold Ca to Cap according to need, and then determine whether collection is necessary based on the collection threshold Ca or the changed collection threshold Cap.

The threshold change condition may be set such that the threshold is changed when the transition of the inventory quantity in the first group satisfies a predetermined condition. For example, the threshold change condition may be set such that the threshold is changed if the transition of the inventory quantity within a predetermined time period from a point in the past to the determination date and time satisfies a predetermined condition.

For example, the threshold change condition may be set such that the replenishment threshold is changed when the quantity of money has sharply decreased in the recent period, so as to determine that replenishment of money is required, even in situations where it would be determined that the replenishment of money is not required in the absence of such a condition. The threshold change condition may be set such that the replenishment threshold is changed when the quantity of money has been gently decreased in the recent period, so as to determine that replenishment of money is not required, even in situations where it would be determined that the replenishment of money is required in the absence of such a condition.

For example, the threshold change condition may be set such that the collection threshold is changed when the quantity of money has been sharply increased in the recent period, so as to determine that collection of money is required, even in situations where it would be determined that the collection of money is not required in the absence of such a condition. The threshold change condition may be set such that the collection threshold is changed when the quantity of money has been gently increased in the recent period, so as to determine that collection of money is not required, even in situations where it would be determined that the collection of money is required in the absence of such a condition.

For example, the threshold condition may be set such that a threshold is changed in a case where a date, a day of the week, or a time slot satisfies a predetermined condition. For example, the threshold may be changed, on December 24 every year, on the 25th of every month, every Saturday, from 7 o'clock to 9 o'clock, or the like. For example, even in situations where it is normally determined that replenishment/collection of money is not required, the threshold change condition may be set such that it is determined that the replenishment/collection of money is required on days and time slots during which a predetermined event occurs. The threshold change condition may be set such that the threshold set for the first group is changed according to information on the weather near a store in the first group. For example, in a case where the number of customers decreases due to the weather, even in situations where it is normally determined that replenishment/collection of money is required, the threshold change condition may be set such that it is determined that the replenishment/collection of money is not required depending on the weather.

(Prediction of Inventory Quantity and Change of Threshold Value)

Figure 7A:
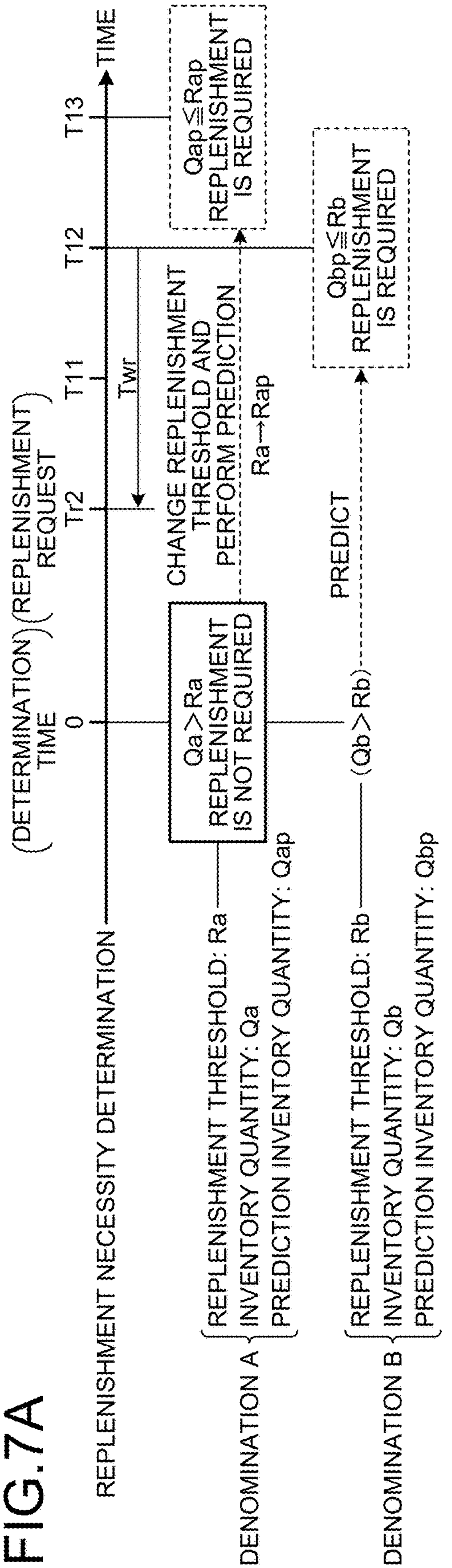
FIG. 7A illustrates an example in which an inventory quantity is predicted and a replenishment threshold is changed.
Figure 7B:
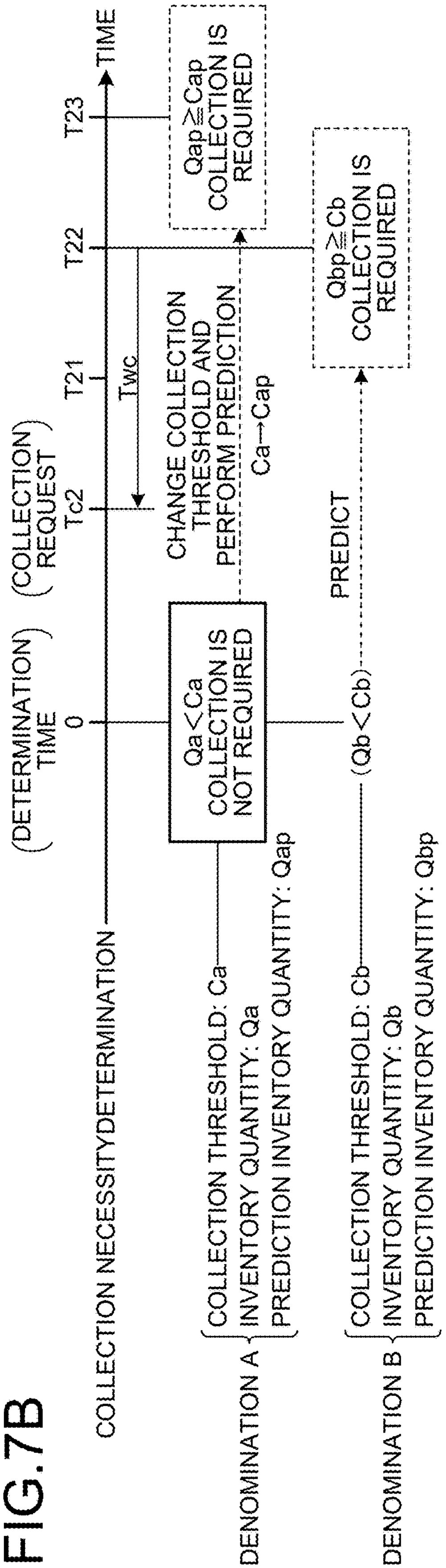
FIG. 7B illustrates an example in which an inventory quantity is predicted and a collection threshold is changed.

In the management apparatus 10, in the prediction process for the inventory quantity as described with reference to FIGS. 5A and 5B, the threshold may be changed based on the threshold change condition as described with reference to FIGS. 6A and 6B. FIG. 7A illustrates an example in which the prediction process for an inventory quantity is performed and the replenishment threshold is changed. FIG. 7B illustrates an example in which the prediction process for an inventory quantity is performed and the collection threshold is changed. Rectangles shown in FIGS. 7A and 7B each indicate a determination process by the management apparatus 10.

When the inventory quantity of money in the future is predicted and a determination as to whether replenishment of money is necessary is performed based on the prediction result as described with reference to FIG. 5A, the management apparatus 10 can change the replenishment threshold if necessary by performing determination based on the threshold change condition.

For example, as shown in FIG. 7A, the management apparatus 10 changes the replenishment threshold Ra to the replenishment threshold Rap if the threshold change condition for denomination A is satisfied, and predicts a time period T13 until replenishment is required based on the changed replenishment threshold Rap. In the example shown in FIG. 7A, the prediction time period T12 for denomination B is obtained based on the replenishment threshold Rb since the threshold change condition for denomination B is not satisfied and the threshold is not changed. In the example shown in FIG. 7A, the replenishment threshold for denomination A has been changed, and thus the prediction time period until replenishment of money of the denomination A is required is changed from T11 described with reference to FIG. 5A to T13 shown in FIG. 7A. Thus, unlike the example shown in FIG. 5A, the management apparatus 10 determines to transmit a request notification for replenishment of money to the CIT company 300 at the time and date after the time period Tr2 has elapsed from the determination date and time. The time period Tr2 is obtained by subtracting the replenishment work time period Twr from the shortest prediction time T12 of the denomination B.

When the inventory quantity of money in the future is predicted and a determination as to whether collection of money is necessary is performed based on the prediction result as described with reference to FIG. 5B, the management apparatus 10 can change the collection threshold if necessary by performing determination based on the threshold change condition.

For example, as shown in FIG. 7B, the management apparatus 10 changes the collection threshold Ca to the collection threshold Cap if the threshold change condition for denomination A is satisfied, and predicts a time period T23 until collection is required based the changed collection threshold Cap. In the example shown in FIG. 7B, the prediction time period T22 for denomination B is obtained based on the collection threshold Cb since the threshold change condition for denomination B is not satisfied and the threshold is not changed. In the example shown in FIG. 7B, the collection threshold for denomination A has been changed, and thus the prediction time period until the collection of money of the denomination A is necessary is changed from T21 described with reference to FIG. 5B to T23 shown in FIG. 7B. Thus, unlike the example shown in FIG. 5B, the management apparatus 10 determines to transmit a request notification for collection of money to the CIT company 300 at the time and date after the time period Tc2 has elapsed from the determination date and time. The time period Tc2 is obtained by subtracting the collection work time period Twc from the shortest prediction time period T22 of the denomination B.

Also, in the example described with reference to FIGS. 7A and 7B, the prediction result of the inventory quantity may be revised, and/or the replenishment work time period Twr and the collection work time period Twc may be revised, based on events that influence the inventory quantity of money, as described with reference to FIGS. 5A and 5B. The prediction process may not necessarily be performed when the inventory quantity changes in the inventory information for the group, and the prediction process may be performed at predetermined intervals. The management apparatus 10 may not necessarily be configured to determine whether replenishment/collection of money is necessary using the threshold registered in the inventory information, then change the threshold based on the threshold change condition, and again perform determination. The management apparatus 10 may first determine whether the threshold change condition is satisfied, change the threshold according to need, and then determine whether replenishment/collection is necessary based on the unchanged or changed threshold.

[Operation of Management Apparatus]

Operation performed by the management apparatus 10 will be described with reference to FIG. 8 to FIG. 10. A user who uses the money handling system can perform settings relating to replenishment/collection of money and can confirm inventory information, by using the operation unit 12 and the display 13 of the management apparatus 10 or an operation unit and a display of an operation terminal connected to the management apparatus 10.

FIG. 8 shows an example of a setting screen on replenishment/collection of money. When the item "group ID" displayed on the setting screen is changed, a setting screen for replenishment/collection corresponding to the changed group is displayed. The description will be continued with an example in which a group ID of "G001" of the first group is selected.

All the denominations of money in the first group are displayed in a table labeled "storage unit" shown in FIG. 8. In the table, minimum quantity, replenishment threshold, ideal quantity, maximum quantity, and collection threshold are displayed for each denomination. The user can change settings for the minimum quantity, the replenishment threshold, the ideal quantity, the maximum quantity, and the collection threshold in the table of the storage unit.

The minimum quantity indicates the minimum quantity for each denomination of money set for the first group. The replenishment threshold for determining whether replenishment of money is necessary can be set by inputting a value or inputting a ratio to the minimum quantity. As shown in FIG. 8, when 110% is inputted as the replenishment threshold, the replenishment threshold is set to 330 pieces which is 110% of the minimum quantity of 300 pieces. The ideal quantity indicates the ideal quantity for each denomination of money set for the first group. The maximum quantity indicates the maximum quantity for each denomination of money set for the first group. The collection threshold for determining whether collection of money is necessary can be set by inputting a value or by inputting a ratio to the maximum quantity. As shown in FIG. 8, when 80% is inputted as the collection threshold, the collection threshold is set to "2400 pieces" which is "80%" of the maximum quantity of "3000 pieces".

The replenishment threshold and the collection threshold set in the table of the storage unit correspond to the thresholds in the inventory information shown in FIG. 3C. The ideal quantity is used to determine a replenishment quantity or a collection quantity when the management apparatus 10 has determined that replenishment or collection of money is required. When performing replenishment of money, the difference between the current quantity and the ideal quantity of money is set as the replenishment quantity. When performing collection of money, the difference between the current quantity and the ideal quantity of money is set as the collection quantity.

For example, in the example shown in FIG. 8, when the quantity of 1-dollar notes becomes 310 pieces and it is determined that replenishment is required, the management apparatus 10 sets the replenishment quantity of 1-dollar notes to 1690 pieces which is the difference between 310 pieces and the ideal quantity of 2000 pieces. Similarly, when the quantity of 1-dollar notes becomes 2500 pieces and it is determined that collection is required, the management apparatus 10 sets the collection quantity of 1-dollar notes to 500 pieces which is the difference between 2500 pieces and the ideal quantity of 2000 pieces.

In a table labeled "container" in FIG. 8, the number of containers, maximum quantity, and transport upper limit set for the first group are displayed. The user can change settings for the number of containers, the maximum quantity, and the transport upper limit in this table. The transport upper limit may be determined based on the physical storage limit of the money handling apparatus or the container. The transport upper limit may be determined based on the contents of the insurance contract or the like. For example, in a case where the quantity, the weight, the amount, or the like of money to be transported per one cash transport is limited under a contract with a CIT company, each upper limit may be determined based on the contract. For example, in a case where the quantity or the amount of money to be covered by insurance per one cash transport is determined under a contract with an insurance company, each upper limit may be determined based on the quantity or the amount of money in the contract.

The number of containers indicates the number of containers 166 to be used for replenishment/collection of money in the first group. The maximum quantity indicates the quantity of money that can be stored using all the containers 166. The transport upper limit is set for limiting money to be transported by the CIT company 300 per transport. The transport upper limit can be set by inputting at least one of the quantity, the weight, and the amount of money. The upper limit of the quantity of money can be set as the quantity or a ratio to the maximum quantity.

In the example shown in FIG. 8, the first group has "three" containers 166 for banknotes, and each of the three containers 166 can store therein 1000 banknotes, i.e., "3000" banknotes can be stored at maximum. However, the banknotes per transport are limited such that the quantity is equal to or less than "2100 pieces" which is "70%" of the maximum quantity, and the total amount of the banknotes and coins is equal to or less than "$7 . . . ". Similarly, the first group has "four" containers 166 for coins, and each of the four containers 166 can store therein 2000 coins, i.e., "8000" coins can be stored at maximum. However, the coins per transport are limited such that the quantity is equal to or less than "5600 pieces" which is "70%" of the maximum quantity, the weight is equal to or less than "1 . . . kg", and the total amount of the coins and banknotes is equal to or less than "$7 . . . ".

As shown in FIG. 8, in a case where the transport upper limit is set for the containers 166, the management apparatus 10 performs determination based on the transport upper limit, in addition to determination based on the replenishment threshold and the collection threshold. For example, upon determining that replenishment of money is required, the management apparatus 10 determines whether a replenishment quantity is within the transport upper limit. If the replenishment quantity exceeds the transport upper limit, the management apparatus 10 reduces the replenishment quantity such that the replenishment quantity does not exceed the transport upper limit. For example, the management apparatus 10 reduces the replenishment quantity for each denomination requiring replenishment, by a predetermined quantity, in order from a denomination having the largest current inventory quantity, whereby the replenishment quantity is adjusted so as not to exceed the transport upper limit. Alternatively, the management apparatus 10 may reduce the replenishment quantity for each of all the denominations that are subject to replenishment, by the same ratio, whereby the replenishment quantity is adjusted so as not to exceed the transport upper limit.

It can be set that the management apparatus 10 increases the replenishment quantity within a range, in which the replenishment quantity does not exceed the transport upper limit, when the replenishment quantity is less than the transport upper limit. For example, the management apparatus 10 increases the replenishment quantity for each of all the denominations that are subject to replenishment, by the same ratio, within a range in which the replenishment quantity does not exceed the transport upper limit. For example, if there is a denomination whose inventory quantity is less than the ideal quantity but that is not subject to replenishment, the management apparatus 10 adds the difference between the ideal quantity and the current inventory quantity of each denomination to the total quantity of money for replenishment, in order from a denomination having the smallest inventory quantity, within a range in which the replenishment quantity does not exceed the transport upper limit.

Similarly, upon determining that collection of money is required, the management apparatus 10 determines whether a collection quantity is within the transport upper limit. If the collection quantity exceeds the transport upper limit, the management apparatus 10 reduces the collection quantity such that the collection quantity does not exceed the transport upper limit. For example, the management apparatus 10 reduces the collection quantity for each denomination requiring collection, by a predetermined quantity, in order from a denomination having the largest current inventory quantity, whereby the collection quantity is adjusted so as not to exceed the transport upper limit. Alternatively, the management apparatus 10 may reduce the collection quantity for each of all the denominations that are subject to collection, by the same ratio, whereby the collection quantity is adjusted so as not to exceed the transport upper limit.

It can be set that the management apparatus 10 increases the collection quantity within a range, in which the collection quantity does not exceed the transport upper limit, when the collection quantity is less than the transport upper limit. For example, the management apparatus 10 increases the collection quantity of money of each of all the denominations that are subject to collection, by the same ratio, within a range in which the collection quantity does not exceed the transport upper limit. For example, if there is a denomination whose inventory quantity is more than the ideal quantity but that is not subject to collection, the management apparatus 10 adds the difference between the ideal quantity and the current inventory quantity of each denomination to the total quantity of money for collection, in order from a denomination having the largest inventory quantity, within a range in which the collection quantity does not exceed the transport upper limit.

Figure 9:
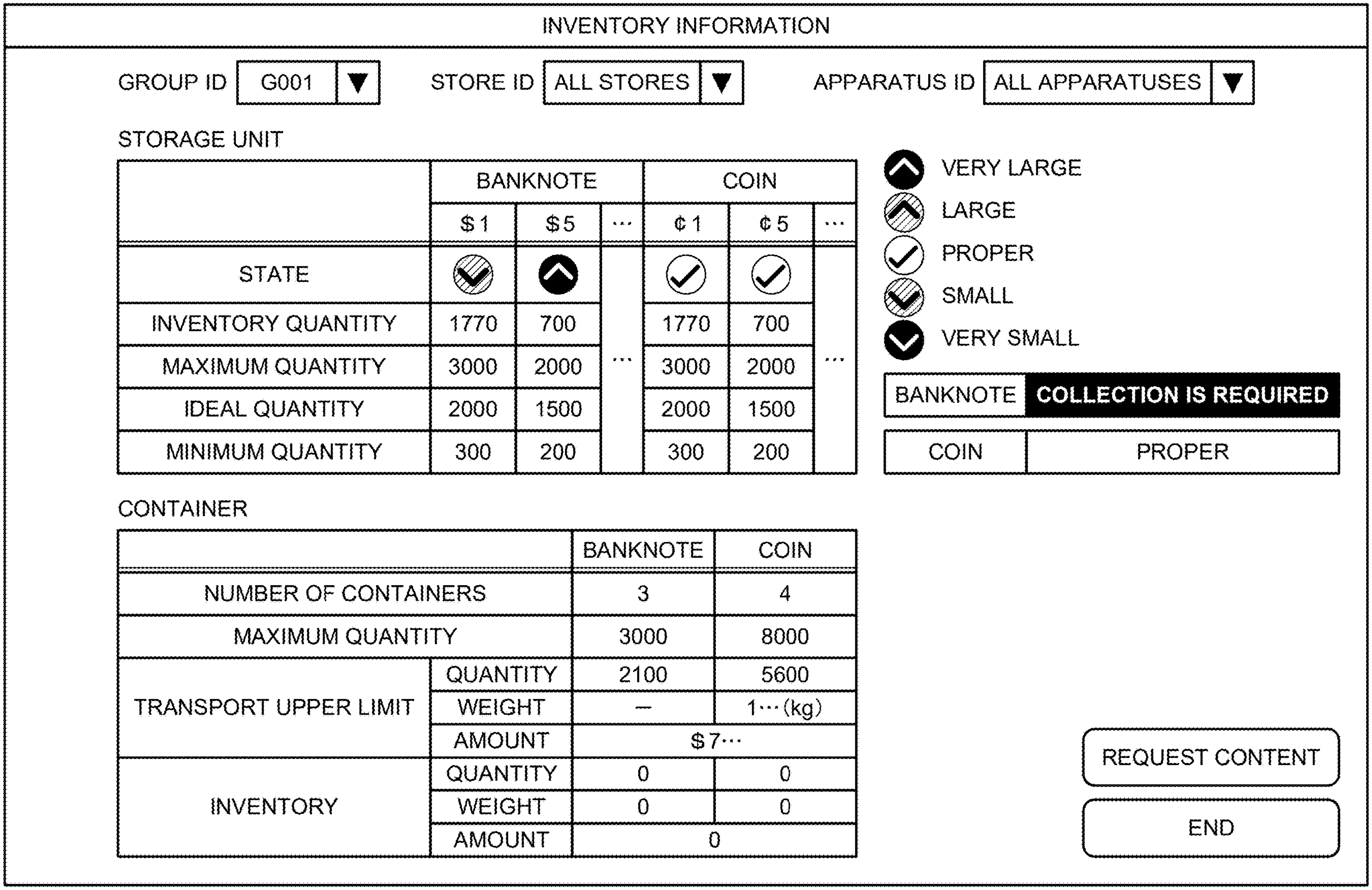
FIG. 9 shows an example of a confirmation screen for inventory information.
Figure 10:
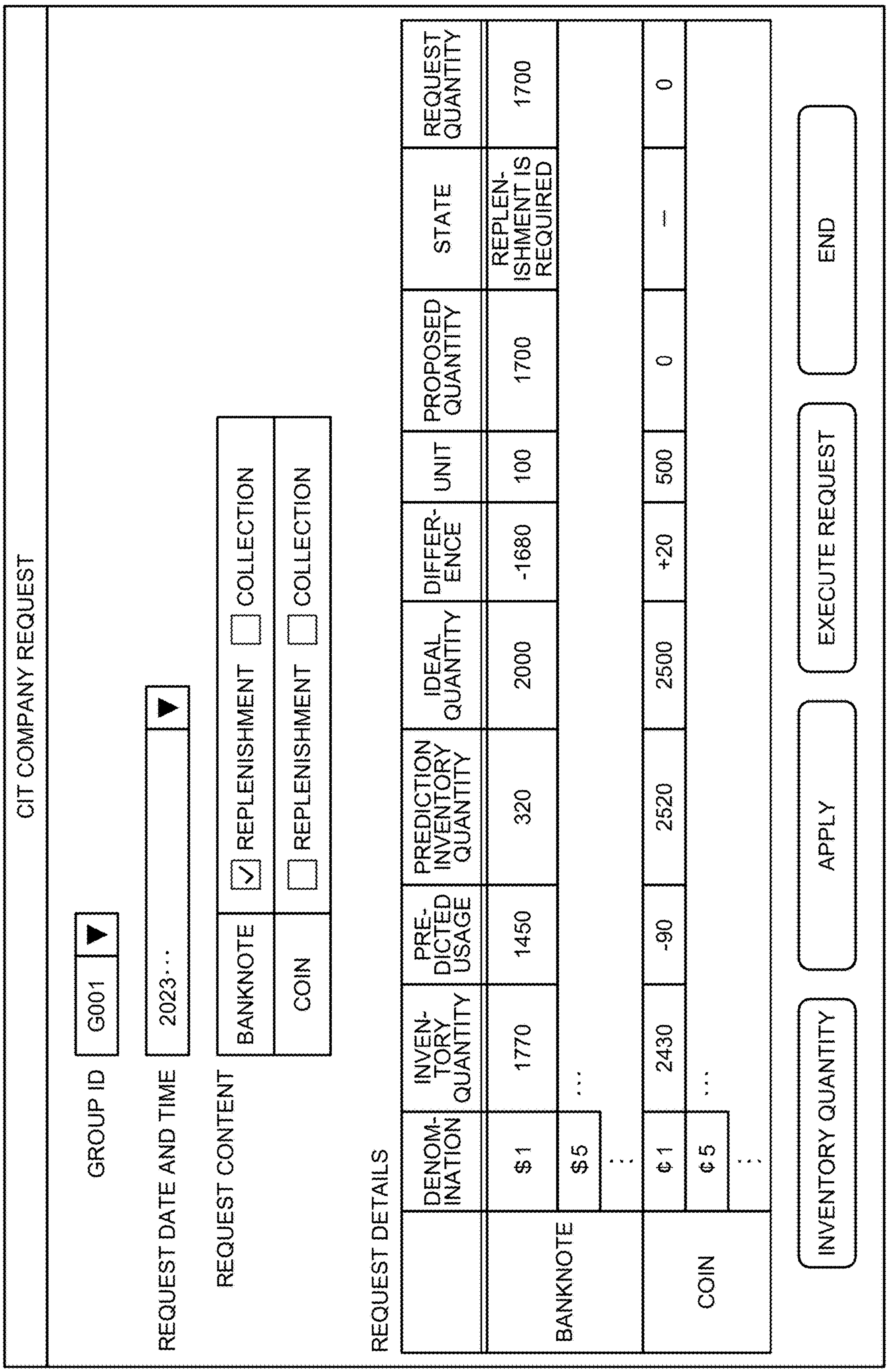
FIG. 10 shows an example of a screen displayed when the management apparatus determined that replenishment of money is required.

FIG. 9 shows an example of a confirmation screen of inventory information. When the item "group ID" displayed on the screen is changed, the inventory information corresponding to the changed group is displayed on the screen. The description will be continued with an example in which a group ID of "G001" for the first group is selected.

As shown in FIG. 9, when "all stores" is selected as a store ID, the inventory information of the first group is displayed. When one store among a plurality of stores 1*a* to 1*c* belonging to the first group is selected as the store ID, the inventory quantity of the selected store is displayed on the confirmation screen. When one apparatus ID is selected in a state where the store ID is selected, the inventory quantity in the selected one money handling apparatus 100, among a plurality of money handling apparatuses 100 in the selected store, is displayed on the confirmation screen.

All the denominations of money in the first group are displayed in a table labeled "storage unit" shown in FIG. 9. In the table, state, inventory quantity, maximum quantity, ideal quantity, and minimum quantity for each denomination are displayed for each denomination. Each of the maximum quantity, the ideal quantity, and the minimum quantity correspond to quantities set using the setting screen shown in FIG. 8. The inventory quantity corresponds to the quantity in the inventory information shown in FIG. 3C. That is, the inventory quantity indicates the quantity, for each denomination, of money that is currently present in the first group, and is managed by the management apparatus 10 by acquiring transaction information and/or apparatus inventory information from each of the money handling apparatuses 100.

The state is information to confirm a state on replenishment/collection of money. FIG. 9 shows an example in which the inventory quantity for each denomination is classified and displayed in five levels: "very large", "large", "proper", "small", and "very small". For example, a denomination having an inventory quantity that is 90% or more of the maximum quantity is classified as "very large", and a denomination having an inventory quantity that is 110% or less of the minimum quantity is classified as "very small". Among denominations that are classified as neither "very large" nor "very small", a denomination having an inventory quantity that is closer to the maximum quantity than the ideal quantity is classified as "large", a denomination having an inventory quantity that is closer to the minimum quantity than the ideal quantity is classified as "small", and the other denominations are classified as "proper". The classification result is displayed by different patterns or colors as a "state", and thus the user can easily recognize the state of the current inventory quantity for each denomination relating to replenishment/collection of money. A classification method and a display method for the classification result for the inventory quantity are an example, and classification and display may be performed by another method. For example, the user may change settings for the classification method and/or the display method.

In the vicinity of the table of the storage unit, information on whether replenishment is necessary and information on whether collection is necessary are displayed for banknotes and coins. In the example shown in FIG. 9, since collection of banknotes is required, information indicating "banknotes collection is required" is displayed in a different color from other displays, on the right side of the table of the storage unit. Also, since collection of coins is not required, information indicating "coin proper" is displayed on the screen. In a case where replenishment is required, information indicating that the replenishment is required is displayed on the screen. The user can easily recognize whether replenishment/collection of money is necessary in each group, through the displayed information on the screen. In a case where the display of "replenishment is required" or "collection is required" appears on the screen, a button labeled "request content" is displayed on the screen. The user can confirm the request contents, to the CIT company 300, determined by the management apparatus 10 by operating the displayed button (see FIG. 10).

In a table labeled "a container" in FIG. 9, the number of containers, maximum quantity, transport upper limit, and inventory quantity of the first group are displayed. The number of containers, the maximum quantity, and the transport upper limit correspond to each quantity set using the setting screen shown in FIG. 8. The inventory quantity includes the quantity, the weight, and the amount of money stored currently in the containers 166. In the example shown in FIG. 9, no money is stored in each container 166. However, when money is stored in the container 166, the quantity, the weight, and the amount of money are displayed in the table. The management apparatus 10 can manage inventory information for the containers 166.

When the management apparatus 10 has determined that replenishment/collection of money is required as described with reference to FIG. 4 to FIG. 7B, the user can confirm the contents of the replenishment/collection determined by the management apparatus 10. FIG. 10 shows an example of a screen displayed when the management apparatus 10 has determined that replenishment of money is required. FIG. 10 shows the screen of an example in which the management apparatus 10 performs the prediction process as described with reference to FIGS. 5A and 5B and FIGS. 7A and 7B. When the item "group ID" displayed on the screen is changed, the inventory information corresponding to the changed group is displayed on the screen. The description will be continued with an example in which a group ID of "G001" of the first group is selected.

The screen displays the request date and time indicating when a request notification for replenishment/collection is to be transmitted to the CIT company 300, which has been determined by the management apparatus 10. The user can change the transmission date and time of the request notification by selecting the item "request date and time" on the screen. In a table labeled "request contents", the contents of replenishment/collection determined by the management apparatus 10 are displayed. FIG. 10 shows an example in which the management apparatus 10 has determined that replenishment with banknotes is required. When the management apparatus 10 has determined that collection of banknotes is required, collection of banknotes is selected on the screen. Similarly, when the management apparatus 10 has determined that replenishment with coins or collection of coins is required, replenishment with coins or collection of coins is selected on the screen. The user can also change the request contents on the screen.

In a table of request details, an inventory quantity, a predicted usage, an ideal quantity, a difference, unit, a proposed quantity, a state, and a request quantity for each denomination are displayed. These are displayed for all the denominations of money in the first group. The inventory quantity and the ideal quantity correspond to those shown in FIG. 8 and FIG. 9.

The predicted usage indicates the quantity of money to be increased or decreased, which is predicted by the management apparatus 10 through the prediction process as described with reference to FIGS. 5A and 5B and FIGS. 7A and 7B. The prediction inventory quantity indicates the inventory quantity of money at the request date and time, which is calculated based on the predicted usage. The difference indicates the difference between the prediction inventory quantity and the ideal quantity. The example shown in FIG. 10 indicates that the current inventory quantity of 1-dollar notes is "1770 pieces", the management apparatus 10 predicted that the predicted usage until the request date and time is "1450 pieces", the management apparatus 10 calculated that the prediction inventory quantity at the request date and time is "320 pieces" (=1770-1450), and also calculated that the difference between the prediction inventory quantity and the ideal quantity of "2000 pieces" is "−1680 pieces" (=320-2000).

The unit indicates the minimum quantity of money, for each denomination, to be moved when performing replenishment/collection of money. For example, in a case where the unit for replenishment by the CIT company 300 is determined as a batch of banknotes or a batch of wrapped coins, the number thereof is displayed as "unit". In a case where the user sets the unit for replenishment/collection of money, the management apparatus 10 can determine a replenishment quantity and a collection quantity, based on the unit set by the user. The proposed quantity in the table labeled "request details" indicates a replenishment quantity and a collection quantity determined by the management apparatus 10, based on the difference and the number set in the unit, shown in the table. In the example shown in FIG. 10, since replenishment with 1-dollar notes is performed in units of "100 pieces", the management apparatus 10 rounds up the difference of "1680 pieces" calculated from the ideal quantity, in units of 100 pieces, and determines that the proposed quantity, i.e., the replenishment quantity, is "1700 pieces". The state in the table indicates whether replenishment is necessary or unnecessary. In the example in FIG. 10, the management apparatus 10 determines that replenishment with 1-dollar notes is required. Regarding a denomination for which the management apparatus 10 determined to require collection, "collection is required" is displayed corresponding to the denomination.

Upon confirming the contents displayed as the request date and time, the request contents, and the request details on the screen, the user can manually change, if necessary, the contents determined automatically by the management apparatus 10 by changing the displayed contents and operating a button labeled "apply". The user can operates a button labeled "inventory quantity" on the screen to display the inventory information shown in FIG. 9. The user can consider the request contents to the CIT company 300 while confirming the inventory information. The user can also immediately transmit a request notification for replenishment/collection of money to the CIT company 300 by switching the request date and time to an option labeled "immediate" and operating a button labeled "execute request". In addition, the user may change the request contents to the CIT company 300, based on the change history of the quantity of money within the group or the like. The management apparatus 10 continuously manages the inventory quantity of each group in a time-sequential manner. The user may use the inventory quantity being managed by the management apparatus 10 to confirm the change history of the quantity of money to change the request contents.

[Process in Management Apparatus]

Figure 11:
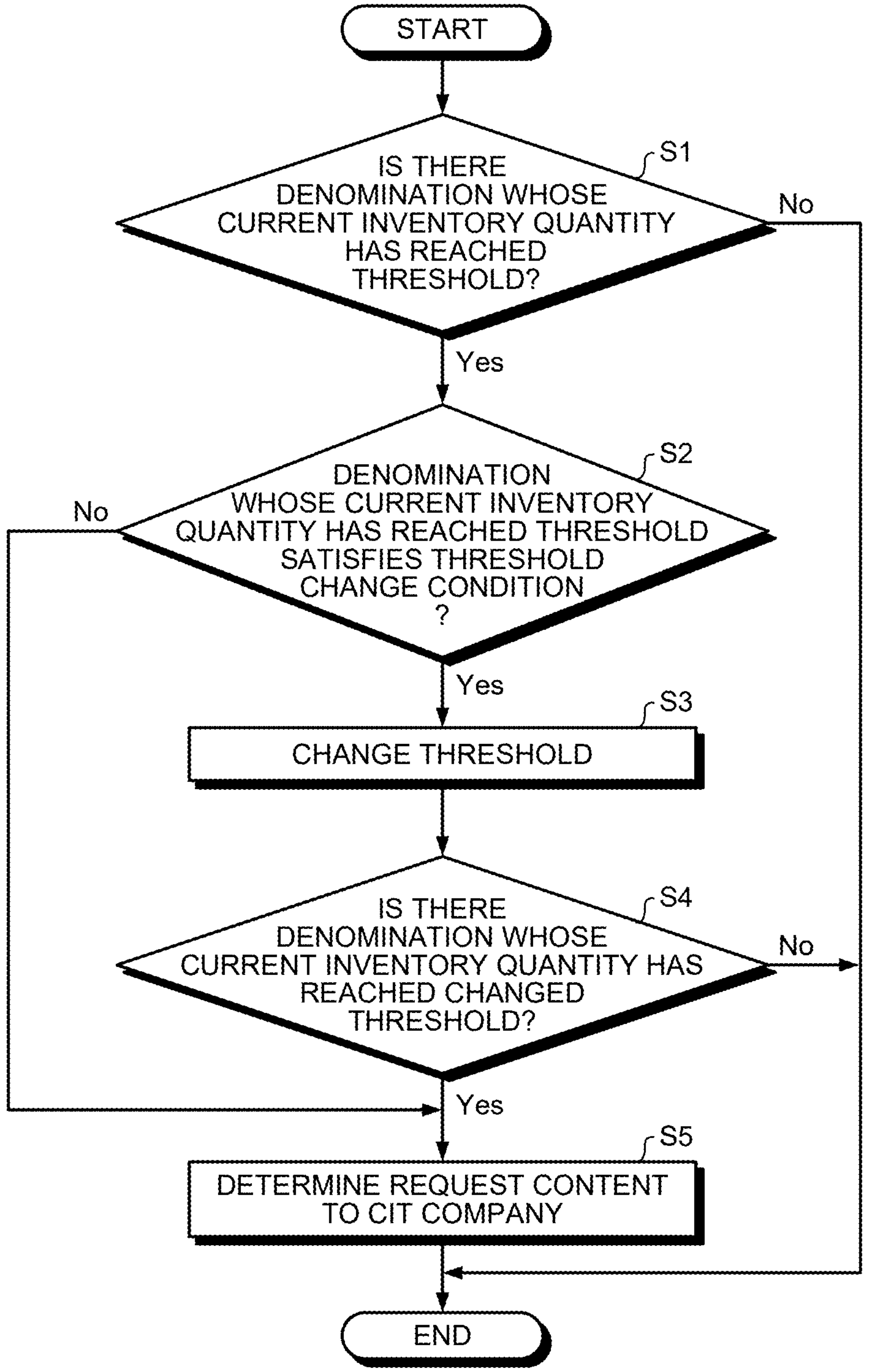
FIG. 11 is a flowchart showing an example of a process flow performed by the management apparatus.

FIG. 11 is a flowchart showing an example of a process flow performed by the management apparatus 10. For example, the management apparatus 10 can perform the process described with reference to FIGS. 6A and 6B according to the flow shown in FIG. 11.

The management apparatus 10 starts the process shown in FIG. 11 when the inventory quantity of money in a group has changed. The management apparatus 10 determines whether there is money of a denomination whose current inventory quantity has reached a threshold (step S1). If there is not money of a denomination whose current inventory quantity has reached the threshold (step S1; No), the management apparatus 10 ends the process.

If there is money of a denomination whose current inventory quantity has reached the threshold (step S1; Yes), the management apparatus 10 then determines whether the denomination, whose current inventory quantity has reached the threshold, satisfies a threshold change condition (step S2). If the threshold change condition is satisfied (step S2; Yes), the management apparatus 10 changes the threshold (step S3), and again determines whether there is money of a denomination whose current inventory quantity has reached the changed threshold (step S4). If there is not money of a denomination whose current inventory quantity has reached the changed threshold (step S4; No), the process ends.

If the threshold change condition is not satisfied for the money of the denomination whose current inventory quantity has reached the threshold (step S2; No), the management apparatus 10 determines the contents of replenishment/collection to be transmitted to the CIT company 300 for requesting the replenishment/collection of money (step S5), and the process ends. Also, in a case where the threshold change condition has been satisfied, the threshold has been changed, and the current inventory quantity has reached the changed threshold (step S4; Yes), the management apparatus 10 determines the contents of replenishment/collection to be transmitted to the CIT company 300 for requesting the replenishment/collection of money (step S5), and the process ends.

The management apparatus 10 may perform the process shown in FIG. 11 at predetermined intervals. The management apparatus 10 may first change the threshold if necessary, and then may perform a process for comparison and determination of the current inventory quantity and the threshold.

Figure 12:
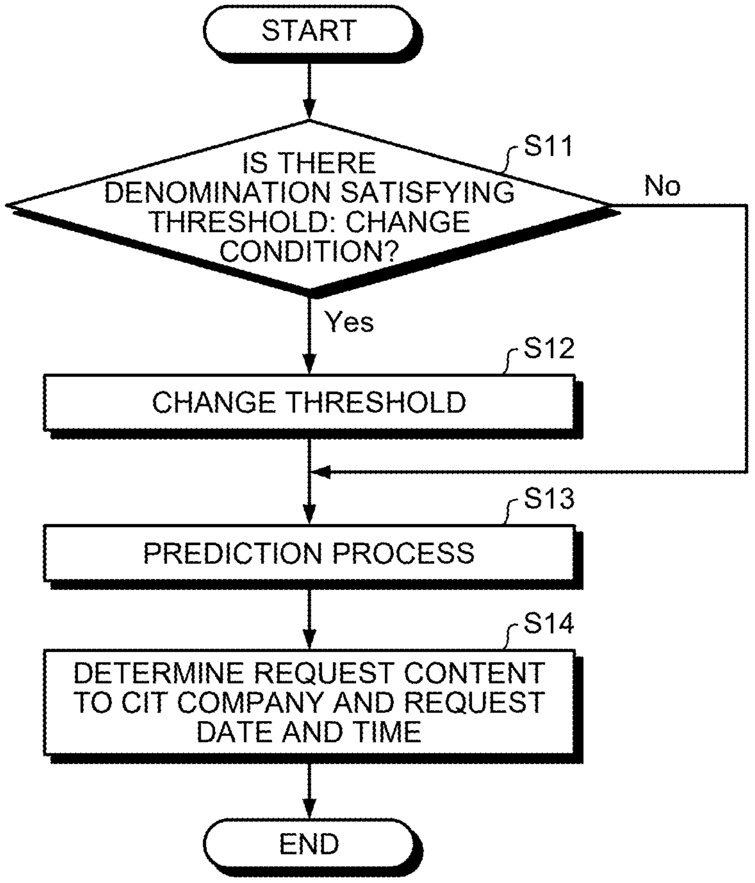
FIG. 12 is a flowchart showing an example of a process flow in a case where the management apparatus performs the prediction process.

FIG. 12 is a flowchart showing an example of a process flow in a case where the management apparatus 10 performs the prediction process. For example, the management apparatus 10 can perform the process described with reference to FIGS. 7A and 7B according to the flow shown in FIG. 12. That is, processes of predicting the inventory quantity for each denomination and determining whether replenishment/collection is necessary are performed as shown in FIG. 12.

When the inventory quantity of money in a group has changed and the prediction process is performed, the management apparatus 10 determines whether there is a denomination satisfying the threshold change condition (step S11). If there is no denomination satisfying the threshold change condition (step S11; No), the management apparatus 10 performs the prediction process without changing the threshold (step S13), and determines the contents of replenishment/collection to be transmitted to the CIT company 300 for requesting the replenishment/collection of money, and the request date and time, i.e., the transmission date and time of the request notification, based on the prediction result (step S14), and the process ends.

If there is a denomination satisfying the threshold change condition (step S11; Yes), the management apparatus 10 changes a threshold for the denomination (step S12). Then, the management apparatus 10 performs the prediction process using the changed threshold (step S13), and determines the contents of replenishment/collection to be transmitted to the CIT company 300, and the request date and time, based on the prediction result (step S14), and the process ends.

The management apparatus 10 may perform the process shown in FIG. 12 at predetermined intervals. The management apparatus 10 may perform the process shown in FIG. 12 after determining whether replenishment/collection is necessary, based on the current inventory quantity. Alternatively, the management apparatus 10 may perform the process shown in FIG. 12 without determining whether replenishment/collection is necessary, based on the current inventory quantity.

In the present embodiment, the first group has been described mainly as an example; however, each process described above is performed in each group managed in the money handling system. Two denominations have been described mainly as an example; however, each process described above may be performed for one denomination or three or more denominations. For ease of description, collection of money and replenishment of money have been described separately. However, replenishment and collection may not necessarily be performed separately, and both replenishment and collection may be performed together. For example, replenishment of denomination A and collection of denomination B may be performed in the same work. Also, in this case, a process corresponding to each of replenishment and collection may be performed in the money handling system. The money handling system may not necessarily perform processes for both replenishment of money and collection of money. The money handling system may perform processes corresponding to one of replenishment and collection, and may not necessarily perform a process for the other.

In the present embodiment, the money handling system includes the management apparatus 10 and the plurality of money handling apparatuses 100, 200. The respective components are conceptually functional components, and thus may not necessarily be physically limited thereto. Distributed or integrated forms of each apparatus are not limited to the forms described above, and all or some of the forms may be distributed or integrated functionally or physically in any unit depending on various loads, use statuses, or the like.

A money handling system according to one aspect of the present embodiment includes: a plurality of money handling apparatuses configured to perform money handling; and a management apparatus communicably connected to the plurality of money handling apparatuses and configured to acquire, from each money handling apparatus, information on an inventory quantity for each kind of money in the apparatus. The plurality of money handling apparatuses are separated into a plurality of groups. The management apparatus manages an inventory quantity for each kind of money by group. The management apparatus requests replenishment or collection of money for each money handling apparatus, based on a threshold for each kind of money set for each group in addition to an inventory quantity for each kind of money in each money handling apparatus. The request is transmitted to a CIT company.

In the above configuration, the management apparatus may predict a time until an inventory quantity of money in a group reaches the threshold, and may determine a timing to make the request, based on the predicted time.

In the above configuration, the management apparatus may determine a timing to make the request, based on the predicted time, and a predetermined time period set based on a time required for replenishment or collection of money in a group.

In the above configuration, the management apparatus may store therein a change condition for changing the threshold. In a case where the change condition is satisfied, the management apparatus may change the threshold and determine the timing, based on the changed threshold.

In the above configuration, the change condition may be set such that the threshold is changed if a transition of the inventory quantity of money in the group satisfies a predetermined condition.

In the above configuration, the management apparatus may determine, among the plurality of money handling apparatuses in each group for which replenishment or collection of money is to be performed, one or more money handling apparatuses to discharge money to outside each apparatus, and the kinds and the quantity for each kind of money to be discharged from each money handling apparatus, and may notify each of the determined money handling apparatuses of the determined kinds and the determined quantity for each kind of money. Upon being notified by the management apparatus, each money handling apparatus may perform money handling of discharging the notified kind and quantity of money, to outside the apparatus.

In the above configuration, the management apparatus may determine, from among the plurality of money handling apparatuses in each group for which replenishment or collection of money is to be performed, one or more money handling apparatuses to store money in each apparatus, and the kinds and the quantity for each kind of money to be stored in each money handling apparatus, and may notify each of the determined money handling apparatuses of the determined kinds and the determined quantity for each kind of money. Upon being notified by the management apparatus, each money handling apparatus may perform money handling of storing the notified kind and quantity of money, in the apparatus.

In the above configuration, the management apparatus may determine, from among the plurality of money handling apparatuses in each group for which replenishment or collection of money is to be performed, one or more money handling apparatuses to discharge money to outside each apparatus, the kinds and the quantity for each kind of money to be discharged from each money handling apparatus, one or more money handling apparatuses to store money in each apparatus, and the kinds and the quantity for each kind of money to be stored in each money handling apparatus, and may transmit a notification on the determined contents, to a cash-in-transit company which receives the request, based on the determined timing.

In the above configuration, the management apparatus may store therein an upper limit for limiting at least one of a quantity, a weight, and an amount of money to be transported by the cash-in-transit company. In a case where replenishment or collection of money is to be performed for the group, the management apparatus may determine the kinds and the quantity for each kind of money for replenishment or collection such that money to be transported by the cash-in-transit company does not exceed the upper limit.

In the above configuration, the management apparatus may determine, from among the plurality of money handling apparatuses in each group for which replenishment or collection of money is to be performed, one or more money handling apparatuses to discharge money to outside each apparatus, the kinds and the quantity for each kind of money to be discharged from each money handling apparatus, one or more money handling apparatuses to store money in each apparatus, and the kinds and the quantity for each kind of money to be stored in each money handling apparatus, and may determine a transportation route for the money, based on the determined contents.

According to the one aspect of the present embodiment, a money handling method is performed for a plurality of money handling apparatuses configured to perform money handling, by a management apparatus communicably connected to the plurality of money handling apparatuses. The money handling method includes: acquiring, from each of the plurality of money handling apparatuses which are separated into a plurality of groups in advance, information on an inventory quantity for each kind of money in each money handling apparatus; and requesting replenishment or collection of money for each money handling apparatus, based on a threshold for each kind of money set for each group, in addition to an inventory quantity for each kind of money in each money handling apparatus.

According to the money handling system and the money handling method of the present embodiment, the plurality of money handling apparatuses are grouped in advance, and the kinds and the quantity for each kind of money are managed by group, whereby money management work including replenishment and/or collection of money for the plurality of money handling apparatuses can be efficiently performed.

As described above, in the money handling system, the plurality of money handling apparatuses can be grouped based on predetermined attributes, money in each group can be managed, and the timing to make a request for replenishment/collection of money to the CIT company can be determined by group. Even if a shortage or surplus of money occurs in one money handling apparatus, no request is made to the CIT company as long as replenishment/collection of money can be performed between the money handling apparatuses in the same group. Thus, the number of requests to the CIT company is minimized, and money in the group can be efficiently utilized. In a case where replenishment/collection of money can be performed within the group, information required for transporting money within the group is notified to the stores, and thus a shortage or surplus of money can be addressed by transporting money between the stores. In addition, in a case where it has been determined that replenishment/collection of money needs to be performed, a method for replenishment/collection, and information on a transportation route or the like are reported, and thus the replenishment/collection work can be performed easily and efficiently.

What is claimed is:

1. A money handling system comprising:
- a plurality of money handling apparatuses configured to perform money handling; and
- a management apparatus communicably connected to the plurality of money handling apparatuses and configured to acquire, from each money handling apparatus, information on an inventory quantity for each kind of money in the apparatus, wherein
- the plurality of money handling apparatuses are separated into a plurality of groups, and
- the management apparatus:
  - manages an inventory quantity for each kind of money by group,
  - makes a request for replenishment or collection of money for each money handling apparatus, based on a threshold for each kind of money set for each group in addition to an inventory quantity for each kind of money in each money handling apparatus, and
  - determines a timing to make the request based on a predetermined time period, the predetermined time period being set based on a time required for completing replenishment or collection of money in each group.

2. The money handling system according to claim 1, wherein the management apparatus predicts a time until an inventory quantity of money in each group reaches the threshold, and further determines the timing to make the request, based on the predicted time.

3. The money handling system according to claim 1, wherein
- the management apparatus stores therein a change condition for changing the threshold, and
- in a case where the change condition is satisfied, the management apparatus changes the threshold and determines the timing based on the changed threshold.

4. The money handling system according to claim 3, wherein the change condition is set such that the threshold is changed if a transition of the inventory quantity of money in each group satisfies a predetermined condition.

5. The money handling system according to claim 1, wherein
- the management apparatus:
  - determines:
    - one or more money handling apparatuses to discharge money therefrom, from among the plurality of money handling apparatuses in each group for which replenishment or collection of money is to be performed,
    - one or more kinds of money to be discharged from the determined one or more money handling apparatuses, and
    - a discharge quantity for each of the one or more kinds of money to be discharged, and
  - notifies each of the determined money handling apparatuses of the determined one or more kinds of money and the determined discharge quantity for each of the one or more kinds of money, and
- each of the determined one or more money handling apparatuses, after being notified by the management apparatus, discharges the notified one or more kinds of money in the notified discharge quantity for each of the one or more kinds of money.

6. The money handling system according to claim 1, wherein
- the management apparatus:
  - determines:
    - one or more money handling apparatuses to store money therein, from among the plurality of money handling apparatuses in each group in which replenishment or collection of money is to be performed,
    - one or more kinds of money to be stored in the determined one or more money handling apparatuses, and
    - a storage quantity for each of the one or more kinds of money to be stored, and
  - notifies each of the determined money handling apparatuses of the determined one or more kinds of money and the determined storage quantity for each of the one or more kinds of money, and
- each of the determined one or more money handling apparatuses, after being notified by the management apparatus, stores the notified one or more kinds of money in the notified storage quantity for each of the one or more kinds of money in the apparatus.

7. The money handling system according to claim 1, wherein
- the management apparatus:
  - determines, from among the plurality of money handling apparatuses in each group for which replenishment or collection of money is to be performed:
    - one or more money handling apparatuses to discharge money therefrom, one or more kinds of money to be discharged from the one or more money handling apparatuses to discharge money, and a discharge quantity for each of the one or more kinds of money to be discharged, and
    - one or more money handling apparatuses to store money therein, one or more kinds of money to be stored in the one or more money handling apparatuses to store money, and a storage quantity for each of the one or more kinds of money to be stored, and
  - transmits a notification that includes the determined one or more money handling apparatuses to discharge money, the determined one or more kinds of money to be discharged, the determined discharge quantity for each of the one or more kinds of money to be discharged, the determined one or more money handling apparatuses to store money, the determined one or more kinds of money to be stored, and the determined storage quantity for each of the one or more kinds of money to be stored, based on the determined timing.

8. The money handling system according to claim 1, wherein the management apparatus stores therein an upper limit for limiting at least one of a quantity, a weight, and an amount of money to be transported by a cash-in-transit company, and in a case where replenishment or collection of money is to be performed for each group, the management apparatus determines one or more kinds of money for replenishment or collection and a replenishment or collection quantity for each of the one or more kinds of money such that the money to be transported by the cash-in-transit company does not exceed the upper limit.

9. The money handling system according to claim 1, wherein the management apparatus:

determines, from among the plurality of money handling apparatuses in each group for which replenishment or collection of money is to be performed:

one or more money handling apparatuses to discharge money therefrom, one or more kinds of money to be discharged from the one or more money handling apparatuses to discharge money, and a discharge quantity for each of the one or more kinds of money to be discharged, and one or more money handling apparatuses to store money therein, one or more kinds of money to be stored in the one or more money handling apparatuses to store money, and a storage quantity for each of the one or more kinds of money to be stored, and determines a transportation route for the money, based on the determined one or more money handling apparatuses to discharge money, the determined one or more kinds of money to be discharged, the determined discharge quantity for each of the one or more kinds of money to be discharged, the determined one or more money handling apparatuses to store money, the determined one or more kinds of money to be stored, and the determined storage quantity for each of the one or more kinds of money to be stored.

10. A money handling method performed for a plurality of money handling apparatuses configured to perform money handling, by a management apparatus communicably connected to the plurality of money handling apparatuses, the money handling method comprising:

acquiring, from each of the plurality of money handling apparatuses which are separated into a plurality of groups in advance, information on an inventory quantity for each kind of money in each money handling apparatus;

requesting replenishment or collection of money for each money handling apparatus, based on a threshold for each kind of money set for each group, in addition to an inventory quantity for each kind of money in each money handling apparatus; and determining a timing to make the request based on a predetermined time period, the predetermined time period being set based on a time required for completing replenishment or collection of money in each group.

* * * * *